(12) United States Patent
Dvorak et al.

(10) Patent No.: US 12,321,695 B2
(45) Date of Patent: Jun. 3, 2025

(54) METHODS AND SYSTEMS FOR SORTING SPREADSHEET CELLS WITH FORMULAS

(71) Applicant: Adaptam Inc., Palo Alto, CA (US)

(72) Inventors: Robert E. Dvorak, Portola Valley, CA (US); Yuriy Garin, San Carlos, CA (US)

(73) Assignee: Adaptam Inc., Palo Alto, CA (US)

( * ) Notice: Subject to any disclaimer, the term of this patent is extended or adjusted under 35 U.S.C. 154(b) by 0 days.

(21) Appl. No.: 17/988,641

(22) Filed: Nov. 16, 2022

(65) Prior Publication Data

US 2023/0153518 A1 May 18, 2023

Related U.S. Application Data

(60) Provisional application No. 63/280,590, filed on Nov. 17, 2021.

(51) Int. Cl.
*G06F 40/18* (2020.01)

(52) U.S. Cl.
CPC .................................... *G06F 40/18* (2020.01)

(58) Field of Classification Search
CPC ....................................................... G06F 40/18
USPC ......................................................... 715/212
See application file for complete search history.

(56) References Cited

U.S. PATENT DOCUMENTS

| | | | |
|---|---|---|---|
| 8,015,481 B2 * | 9/2011 | Jager ....................... | G06F 40/18 715/219 |
| 8,726,143 B2 | 5/2014 | Simkhay et al. | |
| 2008/0028288 A1 * | 1/2008 | Vayssiere ................ | G06F 40/18 715/219 |
| 2013/0013994 A1 * | 1/2013 | Handsaker .............. | G06F 40/18 715/219 |
| 2015/0199328 A1 * | 7/2015 | Danziger ................ | G06F 40/18 715/219 |
| 2016/0253754 A1 * | 9/2016 | Ben-Porat .............. | G06Q 40/04 705/37 |
| 2019/0138590 A1 * | 5/2019 | Shirolkar ............ | G06F 16/2228 |
| 2019/0340219 A1 * | 11/2019 | Schoedl ................ | G06F 3/0481 |
| 2020/0034415 A1 * | 1/2020 | Gordon ................... | G06F 40/18 |

* cited by examiner

*Primary Examiner* — Tuyetlien T Tran
(74) *Attorney, Agent, or Firm* — Haynes Beffel & Wolfeld LLP; Ernest J Beffel, Jr.

(57) ABSTRACT

The technology disclosed relates to accessing data within or external to spreadsheet cells (NSC data) and presenting it to users, so they can select one or more value to populate the cell. In one implementation, the technology disclosed is a spreadsheet function (predefined formula) where the user inputs a cell range or NSC data formula resulting in a button operated drop-down (pop-up or other visual) populating one value within the cell. Once the formula is completed the user can change that value by clicking the button and selecting the desired value from the multiple values presented. In another implementation the function input can be altered to add a constraint (filter) limiting the values presented for selection. In variants of any of the implementations, the presented values can be organized in ascending or descending orders for easy selection and show all values or only the unique (distinct) values.

21 Claims, 25 Drawing Sheets
(24 of 25 Drawing Sheet(s) Filed in Color)

Cancer Test Weekly Results

Dish wt = 1.012

Formula in E2: =A10 (Last wk = 7)

| Week | Gross wt | Net wt | % change | Formula in Column C | Formula in Column D |
|------|----------|--------|----------|---------------------|---------------------|
| 1 | 2.056 | 1.044 | 5.7% | | =(C4-(2-B2))/(2-B2) |
| 2 | 2.135 | 1.123 | 7.6% | =B4-B2 | =(C5-C4)/C4 |
| 3 | 1.945 | 0.933 | -16.9% | =B5-B2 | =(C6-C5)/C5 |
| 4 | 1.742 | 0.73 | -21.8% | =B6-B2 | =(C7-C6)/C6 |
| 5 | 1.703 | 0.691 | -5.3% | =B7-B2 | =(C8-C7)/C7 |
| 6 | 1.634 | 0.622 | -10.0% | =B8-B2 | =(C9-C8)/C8 |
| 7 | 1.598 | 0.586 | 5.8% | =B9-B2 | =(C10-C9)/C9 |
| | | | | =B10-B2 | |

FIG. 2B

Cancer Test Weekly Results

Dish wt = 1.012

Formula in E2: =A10 (Last wk = 2)

| Week | Gross wt | Net wt | % change | Formula in Column C | Formula in Column D |
|------|----------|--------|----------|---------------------|---------------------|
| 4 | 1.742 | #REF! | #REF! | | =(C4-C3)/C3 |
| 3 | 1.945 | 1.945 | #REF! | =B4-#REF! | =(C5-C4)/C4 |
| 6 | 1.634 | #REF! | #REF! | =B5-B1 | =(C6-C5)/C5 |
| 7 | 1.598 | 0.691 | #REF! | =B6-#REF! | =(C7-C6)/C6 |
| 5 | 1.703 | 0.458 | 13.9% | =B7-#REF! | =(C8-C7)/C7 |
| 1 | 2.056 | 0.537 | 17.2% | =B8-B2 | =(C9-(2-B7))/(2-B7) |
| 2 | 2.135 | | | =B9-B7 | =(C10-C9)/C9 |
| | | | | =B10-B7 | |

| | Formula in Column C | Formula in Column D | Formula in Column E |
|---|---|---|---|
| | =B5-SUM(B3:D3) | =(C5-(2-SUM(B3:D3)))/(2-SUM(B3:D3)) | |
| | =B6-SUM(B3:D3) | =(C6-C5)/C5 | |
| | =B7-SUM(B3:D3) | =(C7-C6)/C6 | |
| | =B8-SUM(B3:D3) | =(C8-C7)/C7 | =D8/AVERAGE(D5:D7) |
| | =B9-SUM(B3:D3) | =(C9-C8)/C8 | =D9/AVERAGE(D6:D8) |
| | =B10-SUM(B3:D3) | =(C10-C9)/C9 | =D10/AVERAGE(D7:D9) |
| | =B11-SUM(B3:D3) | =(C11-C10)/C10 | =D11/AVERAGE(D8:D10) |
| | =B12-SUM(B3:D3) | =(C12-C11)/C11 | =D12/AVERAGE(D9:D11) |
| | =B13-SUM(B3:D3) | =(C13-C12)/C12 | =D13/AVERAGE(D10:D12) |

Cancer Test Weekly Results

| | Glass wt | Medium wt | Fluid wt |
|---|---|---|---|
| Dish wt = | 0.716 | 0.243 | 0.053 |

| Week | Gross wt | Net wt | % change | Change index vs. 3 previous wks average |
|---|---|---|---|---|
| 1 | 2.056 | 1.044 | 5.7% | |
| 2 | 2.135 | 1.123 | 7.6% | |
| 3 | 1.945 | 0.933 | -16.9% | |
| 4 | 1.742 | 0.73 | -21.8% | 1771.9% |
| 5 | 1.703 | 0.691 | -13.7% | 174.0% |
| 6 | 1.634 | 0.622 | -7.8% | 111.5% |
| 7 | 1.598 | 0.586 | -10.0% | 68.1% |
| 8 | 1.552 | 0.54 | -5.3% | 51.5% |
| 9 | 1.478 | 0.466 | -5.8% | 46.8% |

(Second table, FIG. 6B — reordered)

Cancer Test Weekly Results

| | Glass wt | Medium wt | Fluid wt |
|---|---|---|---|
| Dish wt = | 0.716 | 0.243 | 0.053 |

| Week | Gross wt | Net wt | % change | Change index vs. 3 previous wks average |
|---|---|---|---|---|
| 1 | 2.056 | 1.044 | 5.7% | |
| 2 | 2.135 | 1.123 | 7.6% | |
| 3 | 1.945 | 0.933 | -16.9% | |
| 4 | 1.742 | 0.73 | -21.8% | 1771.9% |
| 9 | 1.478 | 0.466 | -13.7% | 174.0% |
| 8 | 1.552 | 0.54 | -7.8% | 111.5% |
| 6 | 1.634 | 0.622 | -10.0% | 68.1% |
| 5 | 1.703 | 0.691 | -5.3% | 51.5% |
| 7 | 1.598 | 0.586 | -5.8% | 46.8% |

FIG. 7A

Cancer Test Weekly Results

| | Glass wt | Medium wt | Fluid wt |
|---|---|---|---|
| Dish wt = | 0.716 | 0.243 | 0.053 |

| Week | Gross wt | Net wt | % change | Change index vs. 3 previous wks average | Formula in Column C | Formula in Column D | Formula in Column E |
|---|---|---|---|---|---|---|---|
| 1 | 2.056 | 1.044 | 5.7% | | =B5-SUM(B3:D3) | =(C5-(2-SUM(B3:D3)))/(2-SUM(B3:D3)) | |
| 2 | 2.135 | 1.123 | 7.6% | | =B6-SUM(B3:D3) | =(C6-C5)/C5 | |
| 3 | 1.945 | 0.933 | -16.9% | | =B7-SUM(B3:D3) | =(C7-C6)/C6 | |
| 4 | 1.742 | 0.73 | -21.8% | 1771.9% | =B8-SUM(B3:D3) | =(C8-C7)/C7 | =D8/AVERAGE(D5:D7) |
| 5 | 1.703 | 0.691 | -5.3% | 51.5% | =B9-SUM(B3:D3) | =(C9-C8)/C8 | =D9/AVERAGE(D6:D8) |
| 6 | 1.634 | 0.622 | -10.0% | 68.1% | =B10-SUM(B3:D3) | =(C10-C9)/C9 | =D10/AVERAGE(D7:D9) |
| 7 | 1.598 | 0.586 | -5.8% | 46.8% | =B11-SUM(B3:D3) | =(C11-C10)/C10 | =D11/AVERAGE(D8:D10) |
| 8 | 1.552 | 0.54 | -7.8% | 111.5% | =B12-SUM(B3:D3) | =(C12-C11)/C11 | =D12/AVERAGE(D9:D11) |
| 9 | 1.478 | 0.466 | -13.7% | 174.0% | =B13-SUM(B3:D3) | =(C13-C12)/C12 | =D13/AVERAGE(D10:D12) |

Cancer Test Weekly Results

| | Glass wt | Medium wt | Fluid wt |
|---|---|---|---|
| Dish wt = | 0.716 | 0.243 | 0.053 |

| Week | Gross wt | Net wt | % change | Change index vs. 3 previous wks average | Formula in Column C | Formula in Column D | Formula in Column E |
|---|---|---|---|---|---|---|---|
| 1 | 2.056 | 1.044 | 5.7% | | =B5-SUM(B3:D3) | =(C5-(2-SUM(B3:D3)))/(2-SUM(B3:D3)) | |
| 2 | 2.135 | 1.123 | 7.6% | | =B6-SUM(B3:D3) | =(C6-C5)/C5 | |
| 3 | 1.945 | 0.933 | -16.9% | | =B7-SUM(B3:D3) | =(C7-C6)/C6 | |
| 4 | 1.742 | 0.73 | -21.8% | 1771.9% | =B8-SUM(B3,C3,D3) | =(C8-C7)/C7 | =D8/AVERAGE(D5,D6,D7) |
| 5 | 1.703 | 0.691 | -5.3% | 51.5% | =B9-SUM(B3,C3,D3) | =(C9-C8)/C8 | =D9/AVERAGE(D6,D7,D8) |
| 6 | 1.634 | 0.622 | -10.0% | 68.1% | =B10-SUM(B3,C3,D3) | =(C10-C9)/C9 | =D10/AVERAGE(D7,D8,D9) |
| 7 | 1.598 | 0.586 | -5.8% | 46.8% | =B11-SUM(B3,C3,D3) | =(C11-C10)/C10 | =D11/AVERAGE(D8,D9,D10) |
| 8 | 1.552 | 0.54 | -7.8% | 111.5% | =B12-SUM(B3,C3,D3) | =(C12-C11)/C11 | =D12/AVERAGE(D9,D10,D11) |
| 9 | 1.478 | 0.466 | -13.7% | 174.0% | =B13-SUM(B3,C3,D3) | =(C13-C12)/C12 | =D13/AVERAGE(D10,D11,D12) |

Cancer Test Weekly Results

| | Glass wt | Medium wt | Fluid wt | | |
|---|---|---|---|---|---|
| Dish wt = | 0.716 | 0.243 | 0.053 | | |
| | | | | | |
| Week | Gross wt | Net wt | % change | Change index vs. 3 previous wks average | |
| 1 | 2.056 | 1.044 | 5.7% | | |
| 2 | 2.135 | 1.123 | 7.6% | | |
| 3 | 1.945 | 0.933 | -16.9% | | |
| 4 | 1.742 | 0.73 | -21.8% | 1771.9% | |
| 5 | 1.703 | 0.691 | -5.3% | 51.5% | |
| 6 | 1.634 | 0.622 | -10.0% | 68.1% | |
| 7 | 1.598 | 0.586 | -5.8% | 46.8% | |
| 8 | 1.552 | 0.54 | -7.8% | 111.5% | |
| 9 | 1.478 | 0.466 | -13.7% | 174.0% | |

| Formula in Column C | Formula in Column D | Formula in Column E |
|---|---|---|
| =B5-SUM(B3:D3) | =(C5-(2-SUM(B3:D3)))/(2-SUM(B3:D3)) | |
| =B6-SUM(B3:D3) | =(C6-C5)/C5 | |
| =B7-SUM(B3:D3) | =(C7-C6)/C6 | |
| =B8-SUM(B3,C3,D3) | =(C8-C7)/C7 | =D8/AVERAGE(D5,D6,D7) |
| =B9-SUM(B3,C3,D3) | =(C9-C8)/C8 | =D9/AVERAGE(D6,D7,D8) |
| =B10-SUM(B3,C3,D3) | =(C10-C9)/C9 | =D10/AVERAGE(D7,D8,D9) |
| =B11-SUM(B3,C3,D3) | =(C11-C10)/C10 | =D11/AVERAGE(D8,D9,D10) |
| =B12-SUM(B3,C3,D3) | =(C12-C11)/C11 | =D12/AVERAGE(D9,D10,D11) |
| =B13-SUM(B3,C3,D3) | =(C13-C12)/C12 | =D13/AVERAGE(D10,D11,D12) |

Cancer Test Weekly Results

| | Glass wt | Medium wt | Fluid wt | | |
|---|---|---|---|---|---|
| Dish wt = | 0.716 | 0.243 | 0.053 | | |
| | | | | | |
| Week | Gross wt | Net wt | % change | Change index vs. 3 previous wks average | |
| 1 | 2.056 | 1.044 | 5.7% | | |
| 2 | 2.135 | 1.123 | 7.6% | | |
| 3 | 1.945 | 0.933 | -16.9% | | |
| 4 | 1.742 | 0.73 | -21.8% | 1771.9% | |
| 9 | 1.478 | 0.466 | -13.7% | 174.0% | |
| 8 | 1.552 | 0.54 | -7.8% | 111.5% | |
| 6 | 1.634 | 0.622 | -10.0% | 68.1% | |
| 5 | 1.703 | 0.691 | -5.3% | 51.5% | |
| 7 | 1.598 | 0.586 | -5.8% | 46.8% | |

| Formula in Column C | Formula in Column D | Formula in Column E |
|---|---|---|
| =B5-SUM(B3:D3) | =(C5-(2-SUM(B3:D3)))/(2-SUM(B3:D3)) | |
| =B6-SUM(B3:D3) | =(C6-C5)/C5 | |
| =B7-SUM(B3:D3) | =(C7-C6)/C6 | |
| =B8-SUM(B3,C3,D3) | =(C8-C7)/C7 | =D8/AVERAGE(D5,D6,D7) |
| =B9-SUM(B3,C3,D3) | =(C9-C10)/C10 | =D9/AVERAGE(D11,D13,D10) |
| =B10-SUM(B3,C3,D3) | =(C10-C13)/C13 | =D10/AVERAGE(D12,D11,D13) |
| =B11-SUM(B3,C3,D3) | =(C11-C12)/C12 | =D11/AVERAGE(D7,D8,D12) |
| =B12-SUM(B3,C3,D3) | =(C12-C8)/C8 | =D12/AVERAGE(D6,D7,D8) |
| =B13-SUM(B3,C3,D3) | =(C13-C11)/C11 | =D13/AVERAGE(D8,D12,D11) |

Cancer Test Weekly Results

| | A | B | C | D | E |
|---|---|---|---|---|---|
| 1 | | Glass wt | Medium wt | Fluid wt | |
| 2 | Dish wt = | 0.716 | 0.243 | 0.053 | |
| 3 | | | | | |
| 4 | Week | Gross wt | Net wt | % change | Change index vs. 3 previous wks average |
| 5 | 1 | 2.056 | 1.044 | 5.7% | |
| 6 | 2 | 2.135 | 1.123 | 7.6% | |
| 7 | 3 | 1.945 | 0.933 | -16.9% | |
| 8 | 4 | 1.742 | 0.73 | -21.8% | 1771.9% |
| 9 | 9 | 1.478 | 0.466 | -13.7% | 174.0% |
| 10 | 8 | 1.552 | 0.54 | -7.8% | 111.5% |
| 11 | 6 | 1.634 | 0.622 | -10.0% | 68.1% |
| 12 | 5 | 1.703 | 0.691 | -5.3% | 51.5% |
| 13 | 7 | 1.598 | 0.586 | -5.8% | 46.8% |

| Formula in Column C | Formula in Column D | Formula in Column E |
|---|---|---|
| | =(C5-(2-SUM(B3:D3)))/(2-SUM(B3:D3)) | |
| =B5-SUM(B3:D3) | =(C6-C5)/C5 | |
| =B6-SUM(B3:D3) | =(C7-C6)/C6 | |
| =B7-SUM(B3:D3) | | |
| =B8-SUM(B3,C3,D3) | =(C8-C7)/C7 | =D8/AVERAGE(D5,D6,D7) |
| =B9-SUM(B3,C3,D3) | =(C9-C10)/C10 | =D9/AVERAGE(D11,D13,D10) |
| =B10-SUM(B3,C3,D3) | =(C10-C13)/C13 | =D10/AVERAGE(D12,D11,D13) |
| =B11-SUM(B3,C3,D3) | =(C11-C12)/C12 | =D11/AVERAGE(D7,D8,D12) |
| =B12-SUM(B3,C3,D3) | =(C12-C8)/C8 | =D12/AVERAGE(D6,D7,D8) |
| =B13-SUM(B3,C3,D3) | =(C13-C11)/C11 | =D13/AVERAGE(D8,D12,D11) |

Cancer Test Weekly Results

| | A | B | C | D | E |
|---|---|---|---|---|---|
| 1 | | Glass wt | Medium wt | Fluid wt | |
| 2 | Dish wt = | 0.716 | 0.243 | 0.053 | |
| 3 | | | | | |
| 4 | Week | Gross wt | Net wt | % change | Change index vs. 3 previous wks average |
| 5 | 1 | 2.056 | 1.044 | 5.7% | |
| 6 | 2 | 2.135 | 1.123 | 7.6% | |
| 7 | 3 | 1.945 | 0.933 | -16.9% | |
| 8 | 4 | 1.742 | 0.73 | -21.8% | 1771.9% |
| 9 | 9 | 1.478 | 0.466 | -13.7% | 174.0% |
| 10 | 8 | 1.552 | 0.54 | -7.8% | 111.5% |
| 11 | 6 | 1.634 | 0.622 | -10.0% | 68.1% |
| 12 | 5 | 1.703 | 0.691 | -5.3% | 51.5% |
| 13 | 7 | 1.598 | 0.586 | -5.8% | 46.8% |

| Formula in Column C | Formula in Column D | Formula in Column E |
|---|---|---|
| | =(C5-(2-SUM(B3:D3)))/(2-SUM(B3:D3)) | |
| =B5-SUM(B3:D3) | =(C6-C5)/C5 | |
| =B6-SUM(B3:D3) | =(C7-C6)/C6 | |
| =B7-SUM(B3:D3) | | |
| =B8-SUM(B3:D3) | =(C8-C7)/C7 | =D8/AVERAGE(D5:D7) |
| =B9-SUM(B3:D3) | =(C9-C10)/C10 | =D9/AVERAGE(D10:D11,D13) |
| =B10-SUM(B3:D3) | =(C10-C13)/C13 | =D10/AVERAGE(D11:D13) |
| =B11-SUM(B3:D3) | =(C11-C12)/C12 | =D11/AVERAGE(D7:D8,D12) |
| =B12-SUM(B3:D3) | =(C12-C8)/C8 | =D12/AVERAGE(D6:D8) |
| =B13-SUM(B3:D3) | =(C13-C11)/C11 | =D13/AVERAGE(D8,D11:D12) |

Cancer Test Weekly Results

| Dish wt = | Glass wt 0.716 | Medium wt 0.243 | Fluid wt 0.053 | | Change index vs. 3 previous wks average |
|---|---|---|---|---|---|
| Week | Gross wt | Net wt | | % change | |
| 1 | 2.056 | 1.044 | | 5.7% | |
| 2 | 2.135 | 1.123 | | 7.6% | |
| 3 | 1.945 | 0.933 | | 15.9% | |
| 4 | 1.742 | 0.73 | | 21.8% | 1771.9% |
| 9 | 1.478 | 0.466 | | 13.7% | 174.0% |
| 8 | 1.552 | 0.54 | | 7.8% | 111.5% |
| 6 | 1.634 | 0.622 | | 10.0% | 68.1% |
| 5 | 1.703 | 0.691 | | 5.8% | 51.5% |
| 7 | 1.598 | 0.586 | | 5.3% | 46.8% |

| | Formula in Column C | Formula in Column D | Formula in Column E |
|---|---|---|---|
| | =B5-SUM(B3:D3) | =(C5-(2-SUM(B3:D3)))/(2-SUM(B3:D3)) | |
| | =B6-SUM(B3:D3) | =(C6-C5)/C5 | |
| | =B7-SUM(B3:D3) | =(C7-C6)/C6 | |
| | =B8-SUM(B3:D3) | =(C8-C7)/C7 | =D8/AVERAGE(D5:D7) |
| | =B9-SUM(B3:D3) | =(C9-C10)/C10 | =D9/AVERAGE(D10:D11,D13) |
| | =B10-SUM(B3:D3) | =(C10-C13)/C13 | =D10/AVERAGE(D11:D13) |
| | =B11-SUM(B3:D3) | =(C11-C12)/C12 | =D11/AVERAGE(D7:D8,D12) |
| | =B12-SUM(B3:D3) | =(C12-C8)/C8 | =D12/AVERAGE(D6:D8) |
| | =B13-SUM(B3:D3) | =(C13-C11)/C11 | =D13/AVERAGE(D8,D11:D12) |

FIG. 10B

Cancer Test Weekly Results

| Dish wt = | Glass wt 0.716 | Medium wt 0.243 | Fluid wt 0.053 | | Change index vs. 3 previous wks average |
|---|---|---|---|---|---|
| Week | Gross wt | Net wt | | % change | |
| 1 | 2.056 | 1.044 | | 5.7% | |
| 2 | 2.135 | 1.123 | | 7.6% | |
| 3 | 1.945 | 0.933 | | 15.9% | |
| 4 | 1.742 | 0.73 | | 21.8% | 1771.9% |
| 9 | 1.478 | 0.466 | | 13.7% | 174.0% |
| 6 | 1.634 | 0.622 | | 10.0% | 68.1% |
| 8 | 1.552 | 0.54 | | 7.8% | 111.5% |
| 7 | 1.598 | 0.586 | | 5.3% | 46.8% |
| 5 | 1.703 | 0.691 | | 5.8% | 51.5% |

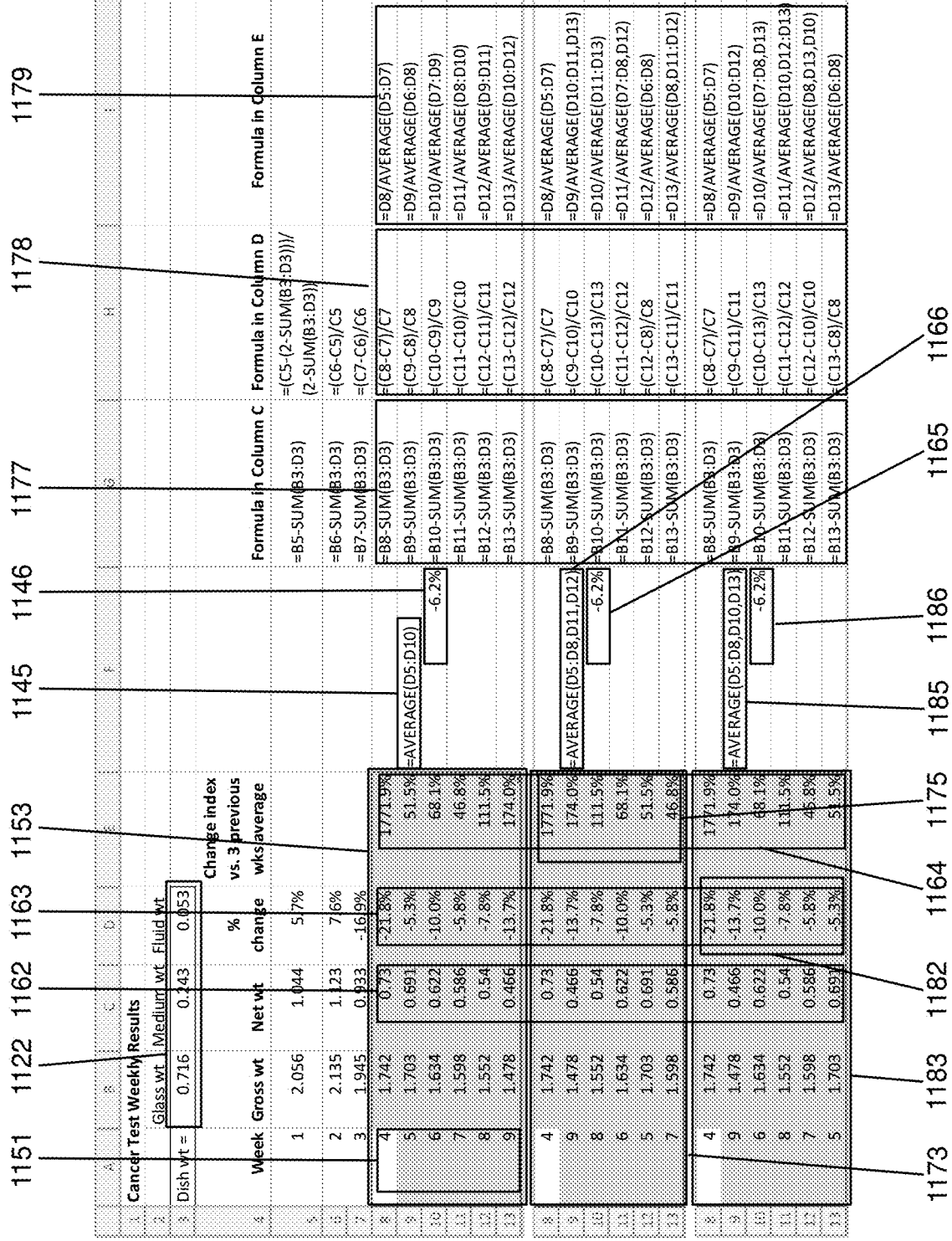

| | A | B | C | D | E | F |
|---|---|---|---|---|---|---|
| 1 | Conceptual color coded example | | | | | |
| 2 | | | | | | |
| 3 | | | | 10697 | | Formula in D3 |
| 4 | Heading_1 | Heading_2 | Heading_3 | Heading_4 | | =SUM(C6:C10)+A11 — 1424 |
| 5 | 5 | 200 | 350 | 2360 | | |
| 6 | | | 250 | 2800 | | Formula in D7 |
| 7 | | | 500 | 1834.2 | | =SUM(A6:B8)-AVERAGE(B11:C13)-A11 — 1435 |
| 8 | | 2000 | 5000 | 1204 | | |
| 9 | 25 | 100 | 150 | 874 | | |
| 10 | 599 | | 2450 | 669 | | |
| 11 | 350 | | | 830 | | |
| 12 | 1000 | | | | | |
| 13 | 400 | | | 800 | | |
| 14 | 599 | 99 | 40 | 901 | | |

FIG. 14B

| | A | B | C | D | E | F |
|---|---|---|---|---|---|---|
| 1 | Conceptual color coded example | | | | | |
| 2 | | | | | | |
| 3 | | | | 10697 | | Formula in D3 |
| 4 | Heading_1 | Heading_2 | Heading_3 | Heading_4 | | =SUM(C8,D8,C9,D9,C10,D10)+A11 — 1465 |
| 5 | 5 | 200 | 350 | 2360 | | |
| 6 | | | 250 | 2800 | | Formula in D7 |
| 7 | | | 500 | 1834.2 | | =SUM(A6,B6,A7,B7,A8,B8)-AVERAGE(B11,C11,B12,C12,B13,C13)-A11 — 1467 |
| 8 | | 2000 | 5000 | 1204 | | |
| 9 | 25 | 100 | 150 | 874 | | |
| 10 | 599 | | 2450 | 669 | | |
| 11 | 350 | | | 830 | | |
| 12 | 1000 | | | | | |
| 13 | 400 | | | 800 | | |
| 14 | 599 | 99 | 40 | 901 | | |

FIG. 15A

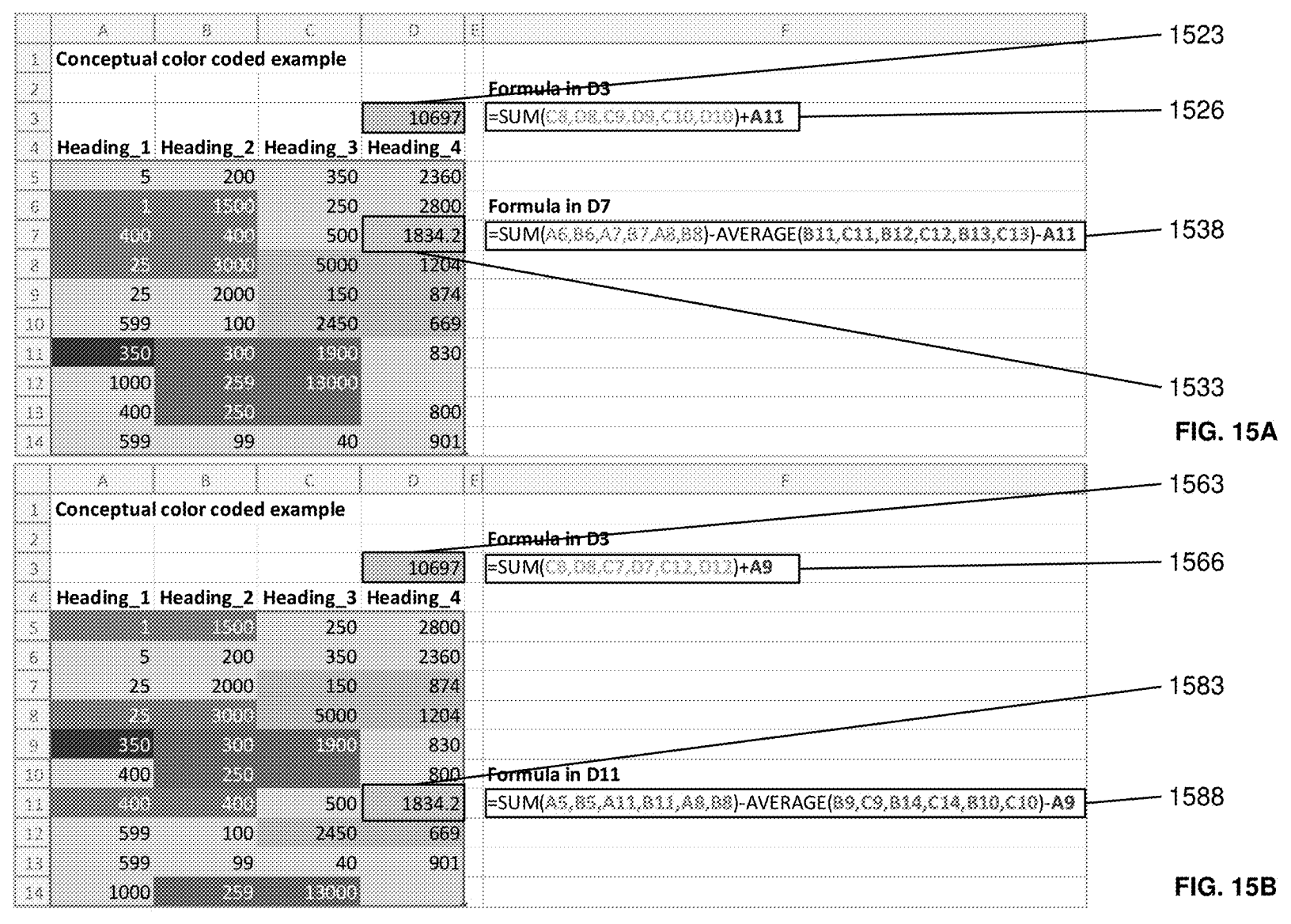

- 1523 — Conceptual color coded example
- 1526 — 10697 (Formula in D3: =SUM(C6,C8,C9,D10,C10,D10)+A11)
- 1538 — Formula in D7: =SUM(A6,B6,A7,B7,A8,B8)-AVERAGE(B11,C11,B12,C12,B13,C13)-A11
- 1533 — 1834.2

FIG. 15B

- 1563 — Conceptual color coded example
- 1566 — 10697 (Formula in D3: =SUM(C6,C8,C7,C12,C12)+A9)
- 1583 — Formula in D11: =SUM(A5,B5,A11,B11,A9,B9)-AVERAGE(B9,C9,B14,C14,B10,C10)-A9
- 1588 — 1834.2

FIG. 16A

Conceptual color coded example

| | A | B | C | D | E |
|---|---|---|---|---|---|
| 1 | Conceptual color coded example | | | | |
| 2 | | | | | |
| 3 | | | | 10697 | Formula in D3 =SUM(C9,B9,C7,D7,C13,D13)+A9 — 1626 |
| 4 | Heading_1 | Heading_2 | Heading_3 | Heading_4 | |
| 5 | 1 | 100 | 250 | 2800 | |
| 6 | 5 | 200 | 350 | 2360 | |
| 7 | 25 | 2000 | 150 | 874 | |
| 8 | 100 | 500 | 5000 | 1204 | |
| 9 | 350 | 500 | 400 | 830 | |
| 10 | 400 | 250 | 600 | 800 | |
| 11 | 599 | 100 | 500 | 1834.2 | Formula in D11 =SUM(A5,B5,A11,B11,A8,B8)-AVERAGE(B9:C9,B14,C14,B10,C10)-A9 — 1643 |
| 12 | 599 | 99 | 2450 | 669 | |
| 13 | | 40 | 901 | | |
| 14 | 1000 | 1000 | | | |

FIG. 16B

Conceptual color coded example

| | A | B | C | D | E |
|---|---|---|---|---|---|
| 1 | Conceptual color coded example | | | | |
| 2 | | | | | |
| 3 | | | | 10697 | Formula in D3 =SUM(C9,B9,C12,D12)+A9 — 1666 |
| 4 | Heading_1 | Heading_2 | Heading_3 | Heading_4 | |
| 5 | 1 | 100 | 250 | 2800 | |
| 6 | 5 | 200 | 350 | 2360 | |
| 7 | 25 | 2000 | 150 | 874 | |
| 8 | 100 | 500 | 5000 | 1204 | |
| 9 | 350 | 500 | 400 | 830 | |
| 10 | 400 | 250 | 600 | 800 | |
| 11 | 599 | 100 | 500 | 1834.2 | Formula in D11 =SUM(A5,B5,A11,B11,A8,B8)-AVERAGE(B9:C10,B14,C14)-A9 — 1688 |
| 12 | 599 | 99 | 2450 | 669 | |
| 13 | | 40 | 901 | | |
| 14 | 1000 | 1000 | | | |

Formula in D3
=SUM(C9:C5,C12:D12)+A9

Formula in D11
=SUM(A5:B5,A11:B11,A8:B8)-AVERAGE(B9:C10,B14:C14)-A9

FIG. 17A

Formula in D3
=SUM(C9:C5,C12:D12)+A9

Formula in D11
=SUM(A5:B5,A11:B11,A8:B8)-AVERAGE(B9:C10,B14:C14)-A9

Different Charity Donations

Start date = 1/1/20

| Charity | Country | Donations | % Total | Formula in Column B | Formula in Column C | Formula in Column D |
|---|---|---|---|---|---|---|
| UNITY | Canada | $ 387,543 | 2.4% | =country{date(>C2},1} | =SUM(donations{country(B5),(date(>C2)}) | =C5/SUM(C5:C12) |
| UNITY | Mexico | $ 128,950 | 0.8% | =country{date(>C2},12} | =SUM(donations{country(B6),(date(>C2)}) | =C6/SUM(C5:C12) |
| UNITY | US | $ 4,894,765 | 30.8% | =country{date(>C2},13} | =SUM(donations{country(B7),(date(>C2)}) | =C7/SUM(C5:C12) |
| Well | Canada | $ 465,782 | 2.9% | =nation{date_well{>C2},11} | =SUM(donations_well{nation(B8),date_well{>C2}}) | =C8/SUM(C5:C12) |
| Well | US | $ 3,887,561 | 24.4% | =nation{date_well{>C2},12} | =SUM(donations_well{nation(B9),date_well{>C2}}) | =C9/SUM(C5:C12) |
| Open | Canada | $ 208,783 | 1.3% | =area{date_open{>C2},11} | =SUM(donations_open{area(B10),date_open{>C2}}) | =C10/SUM(C5:C12) |
| Open | Mexico | $ 154,876 | 1.0% | =area{date_open{>C2},12} | =SUM(donations_open{area(B11),date_open{>C2}}) | =C11/SUM(C5:C12) |
| Open | US | $ 5,783,272 | 36.3% | =area{date_open{>C2},13} | =SUM(donations_open{area(B12),date_open{>C2}}) | =C12/SUM(C5:C12) |

Columns to sort by

Drag/Drop — Sort Order — Columns — "Donations"

Has headers
Sort Direction
Highest to Lowest

Cancel   OK 1923, 1932, 1934, 1939, 1937, 1953, 1975, 1982, 1984, 1987

FIG. 19B

Different Charity Donations

Start date = 1/1/20

| Charity | Country | Donations | % Total | Formula in Column B | Formula in Column C | Formula in Column D |
|---|---|---|---|---|---|---|
| Open | US | $ 5,783,272 | 36.3% | =area{date_open{>C2},13} | =SUM(donations_open{area(B5),date_open{>C2}}) | =C5/SUM(C5:C12) |
| UNITY | US | $ 4,894,765 | 30.8% | =country{date(>C2},13} | =SUM(donations{country(B6),(date(>C2)}) | =C6/SUM(C5:C12) |
| Well | US | $ 3,887,561 | 24.4% | =nation{date_well{>C2},12} | =SUM(donations_well{nation(B7),date_well{>C2}}) | =C7/SUM(C5:C12) |
| Well | Canada | $ 465,782 | 2.9% | =nation{date_well{>C2},11} | =SUM(donations_well{nation(B8),date_well{>C2}}) | =C8/SUM(C5:C12) |
| UNITY | Canada | $ 387,543 | 2.4% | =country{date(>C2},11} | =SUM(donations{country(B9),(date(>C2)}) | =C9/SUM(C5:C12) |
| Open | Canada | $ 208,783 | 1.3% | =area{date_open{>C2},11} | =SUM(donations_open{area(B10),date_open{>C2}}) | =C10/SUM(C5:C12) |
| Open | Mexico | $ 154,876 | 1.0% | =area{date_open{>C2},12} | =SUM(donations_open{area(B11),date_open{>C2}}) | =C11/SUM(C5:C12) |
| UNITY | Mexico | $ 128,950 | 0.8% | =country{date(>C2},12} | =SUM(donations{country(B12),(date(>C2)}) | =C12/SUM(C5:C12) |

Different Charity Donations

| | Start date = | 1/1/20 | | |
|---|---|---|---|---|
| Charity | Country | % Donations Total | Formula in Column B | Formula in Column C |
| UNITY | Canada | 2.4% | =country{date{>C2},I1} | =SUM(donations{country{B5},{date{>C2}})/SUM(C5:C12) |
| UNITY | Mexico | 0.8% | =country{date{>C2},I2} | =SUM(donations{country{B6},{date{>C2}})/SUM(C5:C12) |
| UNITY | US | 30.8% | =country{date{>C2},I3} | =SUM(donations{country{B7},{date{>C2}})/SUM(C5:C12) |
| Welli | Canada | 2.9% | =nation{date_welli{>C2},I1} | =SUM(donations_welli{nation{F8},date_welli{>C2}})/SUM(C5:C12) |
| Welli | US | 24.4% | =nation{date_welli{>C2},I2} | =SUM(donations_welli{nation{F9},date_welli{>C2}})/SUM(C5:C12) |
| Open | Canada | 1.3% | =area{date_open{>C2},I1} | =SUM(donations_open{area{F10},date_open{>C2}})/SUM(C5:C12) |
| Open | Mexico | 1.0% | =area{date_open{>C2},I2} | =SUM(donations_open{area{F11},date_open{>C2}})/SUM(C5:C12) |
| Open | US | 36.3% | =area{date_open{>C2},I3} | =SUM(donations_open{area{F12},date_open{>C2}})/SUM(C5:C12) |

Columns to sort by

Drag Drop | Sort Order | Columns | Sort Direction

"% Donations Total" | Lowest to Highest

Column | Cancel | Ok

FIG. 20B

Different Charity Donations

| | Start date = | 1/1/20 | | |
|---|---|---|---|---|
| Charity | Country | % Donations Total | Formula in Column B | Formula in Column C |
| Open | US | 36.3% | =area{date_open{>C2},I3} | =SUM(donations_open{area{B5},date_open{>C2}})/SUM(C5:C12) |
| UNITY | US | 30.8% | =country{date{>C2},I3} | =SUM(donations_open{country{B6},{date{>C2}})/SUM(C5:C12) |
| Welli | US | 24.4% | =nation{date_welli{>C2},I2} | =SUM(donations_welli{nation{B7},date_welli{>C2}})/SUM(C5:C12) |
| Welli | Canada | 2.9% | =nation{date_welli{>C2},I1} | =SUM(donations_welli{nation{B8},date_welli{>C2}})/SUM(C5:C12) |
| UNITY | Canada | 2.4% | =country{date{>C2},I1} | =SUM(donations_open{country{B9},{date{>C2}})/SUM(C5:C12) |
| Open | Canada | 1.3% | =area{date_open{>C2},I1} | =SUM(donations_open{area{B10},date_open{>C2}})/SUM(C5:C12) |
| Open | Mexico | 1.0% | =area{date_open{>C2},I2} | =SUM(donations_open{area{B11},date_open{>C2}})/SUM(C5:C12) |
| UNITY | Mexico | 0.8% | =country{date{>C2},I2} | =SUM(donations_open{country{B12},{date{>C2}})/SUM(C5:C12) |

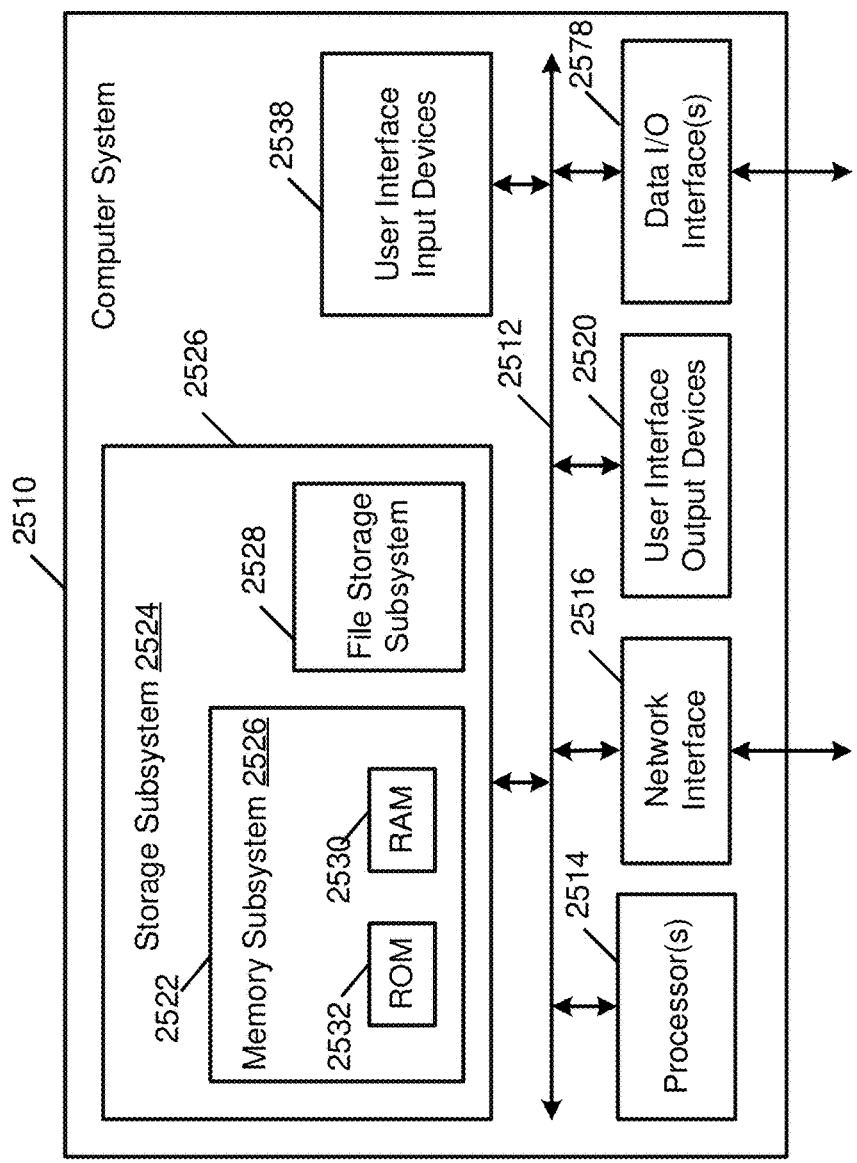
Fig. 25 Computer System

METHODS AND SYSTEMS FOR SORTING SPREADSHEET CELLS WITH FORMULAS

CROSS REFERENCE

This application claims the benefit of and priority to U.S. Provisional Application No. 63/280,590 titled "Methods and Systems for Sorting Spreadsheet Cells with Formulas," filed 17 Nov. 2021.

RELATED APPLICATIONS

This application is related to and incorporates by reference the following applications:

U.S. application Ser. No. 16/031,339, titled "Methods and Systems for Providing Selective Multi-Way Replication and Atomization of Cell Blocks and Other Elements in Spreadsheets and Presentations", filed 10 Jul. 2018, now U.S. Pat. No. 11,182,548, issued 23 Nov. 2021, which claims the benefit of U.S. Provisional Application No. 62/530,835, filed Jul. 10, 2017, U.S. application Ser. No. 16/031,379, titled "Methods and Systems for Connecting a Spreadsheet to External Data Sources with Formulaic Specification of Data Retrieval", filed 10 Jul. 2018, which claims the benefit of U.S. Provisional Application No. 62/530,786, filed Jul. 10, 2017, U.S. application Ser. No. 16/031,759, titled, "Methods and Systems for Connecting A Spreadsheet to External Data Sources with Temporal Replication of Cell Blocks", filed 10 Jul. 2018, which claims the benefit of U.S. Provisional Patent Application No. 62/530,794, filed on Jul. 10, 2017, and U.S. application Ser. No. 16/191,402, titled, "Methods and Systems for Connecting A Spreadsheet to External Data Sources with Ordered Formulaic Specification of Data Retrieved" filed Nov. 14, 2018, which claims the benefit of U.S. Provisional Patent Application No. 62/586,719," filed on Nov. 15, 2017.

U.S. application Ser. No. 17/359,430 titled "Methods and Systems for Constructing A Complex Formula in a Spreadsheet Cell", filed 25 Jun. 2021, which claims priority to and the and U.S. Application 63/044,989, titled "Methods and Systems for Presenting Drop-Down, Pop-Up or Other Presentation of a Multi-Value Data Set in a Spreadsheet Cell", filed 26 Jun. 2020.

U.S. application Ser. No. 17/359,418, titled, "Methods and Systems for Connecting A Spreadsheet to External Data Sources with Ordered Formulaic Specification of Data Retrieved" filed 25 Jun. 2021, which claims priority to and the benefit of U.S. Application 63/044,989, filed 26 Jun. 2020 and U.S. Application 63/044,990, titled "Methods And Systems for Constructing A Complex Formula in a Spreadsheet Cell", filed 26 Jun. 2020. The priority applications are incorporated by reference herein.).

BACKGROUND

Current spreadsheets are excellent in sorting blocks of rows of values (e.g., 3, 5, apple, pear, 1/1/22 or 1/2/22) through a single (simple key) or multiple column (composite key) sorting capability. However, if a user sorts cells containing formulas referencing other cells (e.g., =A5–A4+C3 or =SUM(F6:H9), where the relative position of the cells changes after the sort (pretty much a given since changing relative positions is the purpose of sort) then the formula is corrupted and recalculates incorrectly. This includes sorted cells that reference a cell outside the sort area or reference a cell not in its sort row. It also includes cells outside the sort area referencing cells within the sort area. In those settings users must convert the formulas into values to retain the correct values after the sort, losing the formulas and their ability to propagate changes. Thus, losing any future change flexibility. Therein, lies an opportunity to allow users to do spreadsheet cell area sorts which do not corrupt the formulas and continue to deliver the pre-sort calculated values post the sort.

Our technology makes doing one or many sorts on cells containing cell referencing formulas as simple as doing sorts on values all while retaining the original formula values and automatically adjusting the formulas to avoid value corruption.

SUMMARY

The technology disclosed relates to avoiding formula corruption during sorting of blocks of rows containing formulas referencing cells not within their row of the sort block. In one embodiment our technology updates each of the referenced cells post-sort to retain their presort relationships and therefore their pre-sort calculated value. In another embodiment of our technology, where the formulas include range cell references, our technology effectively atomizes those ranges to the individual cells pre-sort and then retains their pre-sort relationships post-sort. A further embodiment of our technology then effectively collapses the individually referenced post-sort cells into one or more ranges. Our technology avoids formula corruption of cells within the sort area and cells outside the sort area referencing cells within the sort area. It works for single (simple key) or multiple column (composite key) sorts and continues to work for successive different sorts. It works for formulas using cell data, our Non-spreadsheet cell (NSC external data) formulaic data, our formulaic data from cell data and combinations of any or all of those.

Particular aspects of the technology disclosed are described in the claims, specification and drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIGS. 1A, 1B, 2A and 2B examples the formula sort corruption in Microsoft Excel.

FIGS. 4A and 4B example for our technology uncorrupted results for the same formulas and sort as FIG. 1A through FIG. 3B exampled for Microsoft Excel and Google Sheets.

Figures 5A, 5B, 5C, 5D:
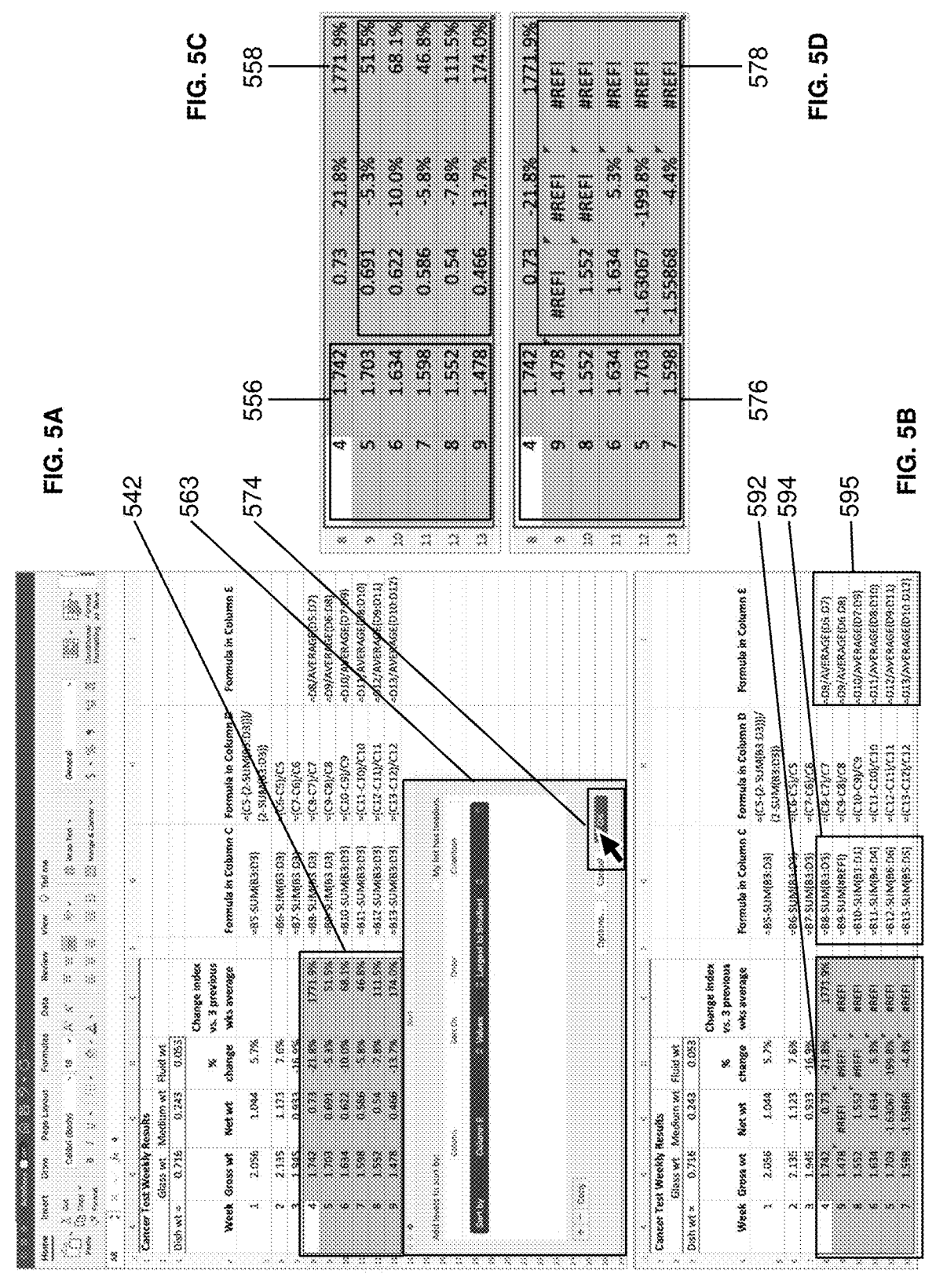

FIGS. 5A, 5B, 5C and 5D examples the formula sort corruption in Microsoft Excel for formulas containing cell ranges.

FIGS. 6A and 6B example for our technology uncorrupted results for the same formulas and sorts as FIG. 5A through FIG. 5D exampled for Microsoft Excel.

FIGS. 7A, 7B, 8A, 8B, 9A and 9B examples steps of the range formula atomization, sorting and recombining of our technology.

FIGS. 10A, 10B, 11A, 11B and 11C examples how our technology continues to work for additional sorts.

FIGS. 13A, 13B, 14A, 14B, 15A, 15B, 16A, 16B, 17A and 17B examples the same color coded two column sort example (as in FIG. 12A and FIG. 12B) in our technology giving an uncorrupted result.

FIGS. 18A and 18B example our sorting technology working for our formulaic data using its data retrievers, our formulaic data using cell references, and non-formulaic data formulas, with the formulaic data from three different NSC and/or in-cell data sets.

FIGS. 19A and 19B example our sorting technology working for our formulaic data using cell references outside of the sort area and non-formulaic data formulas.

FIGS. 20A and 20B example our technology successfully sorting and recalculating cells combining formulaic data in function formulas using cell references outside of the sort area and non-formulaic data formulas.

FIGS. 21A and 21B example our sorting technology successfully sort and recalculating cells combining formulaic data in function formulas using cell references inside and outside of the sort area and non-formulaic data formulas.

FIGS. 22A and 22B examples an inward referencing formula with a single cell reference automatically updating via our technology for the post-sort change in the pre-sort cell location.

FIGS. 23A and. 23B examples inward referencing cell ranges with all their cells within the sortation area and with part of the cell range within the sortation area.

FIGS. 24A and 24B examples outward referencing formulas referencing cells outside the sort area working by themselves.

FIG. 25 depicts an example computer system that can be used to implement aspects of the technology disclosed.

DETAILED DESCRIPTION

Figure 3A:
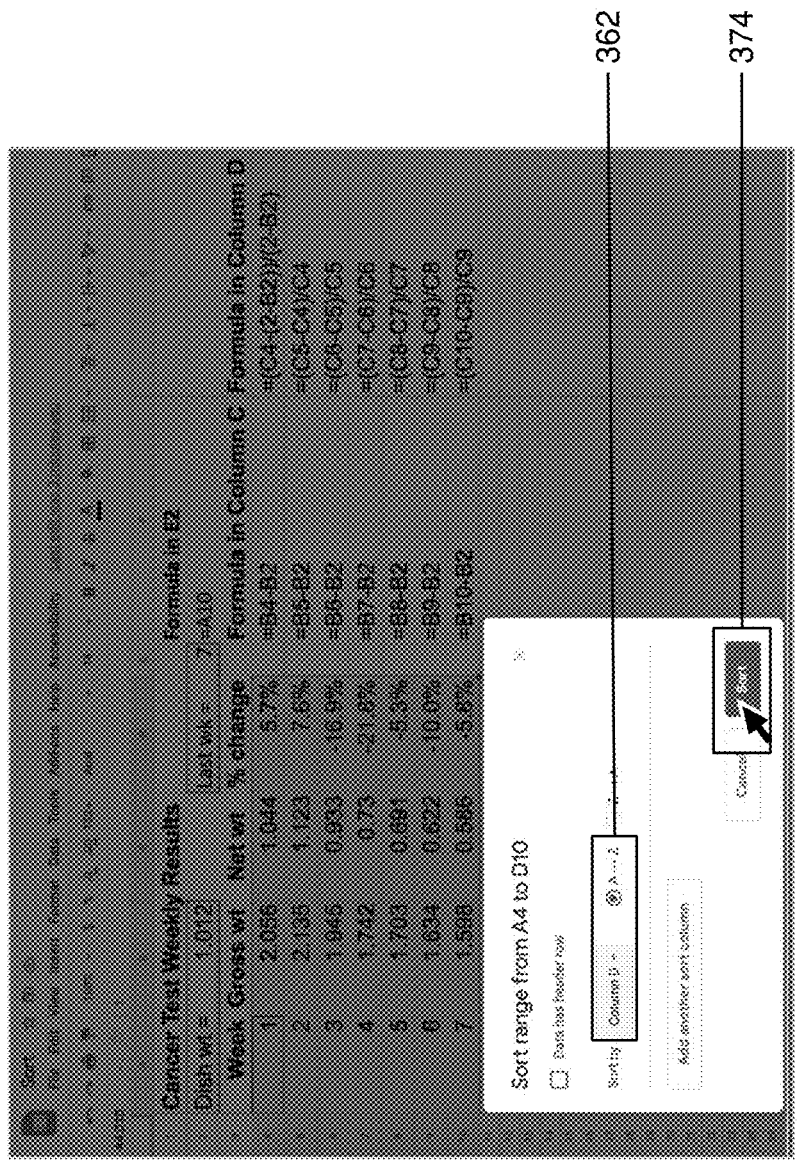
FIGS. 3A and 3B example the same formulas and sort in Google Sheets with the same corrupted output (as Microsoft Excel).

The following detailed description is made with reference to the figures. Example implementations are described to illustrate the technology disclosed, not to limit its scope, which is defined by the claims. Those of ordinary skill in the art will recognize a variety of equivalent variations on the description that follows.

When spreadsheet applications were first created, they electronically emulated tabular paper spreadsheets. More recently, Microsoft Excel, Google Sheets, Apple Numbers and others have dramatically increased the breadth of capabilities and usefulness of spreadsheets. Spreadsheet applications now access data across a wide variety of sources including relational, structured and semi-structured, open data protocol (OData), Web and Hadoop among others; and these applications manipulate data—such as in pivot tables and via Microsoft PowerPivot. Additionally, spreadsheets have extensive functionality for creating charts with SmartArt and for building forms, and they even have programming languages embedded within them, such as Visual Basic (VBA in Excel), Apps Script (in Google Sheets) and Apple Script (in Numbers).

With all the added capabilities, spreadsheet applications have become substantially more complicated. The data manipulation and embedded programming language capabilities can be very powerful but are complicated to learn and therefore they are used by a very small fraction of the spreadsheet application user base. All this complexity has led to over a hundred books and thousands of online videos that have been published to help users understand the capabilities of Excel alone.

Spreadsheet providers like Microsoft Excel and Google Sheets cater to the specialized needs of users through many capabilities including the data sorting capability. That capability, typically accessed from a menu SORT selection or Ribbon button, allows users to select a block of rows and columns and sort the rows by one or more user selected column value sort order/direction (e.g., lowest to highest or A to Z). Those sort orders work in an understandable manner for cells with values (e.g., numbers, text or dates) but when those cells contain formula calculated values referencing other cells, the cells sort and then those formulas recalculate post the sort often with unpredictable (corrupted) results. This is because the current spreadsheets do not correctly post-sort reorder the formula cell references to account for the changes due to the sort, corrupting the post-sort recalculation of the values and in many situations resulting in formulas with calculation errors. Our technology overcomes those formula recalculation problems and does it for formulas using cell data, our Non-spreadsheet cell (NSC external data) formulaic data, our formulaic data from cell data and combinations of any or all of those.

The formulaically defined Non-Spreadsheet Cell (NSC) data variables and related technologies disclosed in "Methods and Systems for Connecting a Spreadsheet to External Data Sources with Formulaic Specification of Data Retrieval" filed previously, allow users to work with all types of numeric and text external data sets (including dates and Booleans) much larger and more complex than can currently fit in traditional spreadsheets. This external data connection creates the foundation for users to automate spreadsheet work without the use of embedded programming languages or special prebuilt data feeds, taking spreadsheets from a tool users employ to conduct one off or routine analytics to a real-time competitor of systems that automate repetitive activities. These formulaic defined data variables can also use in-cell data, as described in our previous filings.

The disclosed technology allows users to sort cells with formulas referencing cells and retain the presort calculated values in the post sort cells by our technology automatically adjusting the formulas for the sort. Our technology allows users to run successive sorts retaining the original values through the further automatic adjustment by our technology of the formula cell references.

Limitations of Existing Technologies

Both of the leading spreadsheets, Microsoft Excel and Google Sheets, give similar results for the sortation of cells with cell referencing formulas. Apple Numbers and LibreOffice Calc also deliver similar results employing the same relational transformation of the formulas. Zoho Sheet does a slightly different formula transformation that typically results in the generation of fewer cells with error messages but a comparable level of incorrect recalculated (corrupted) values.

Figures 1A, 1B:
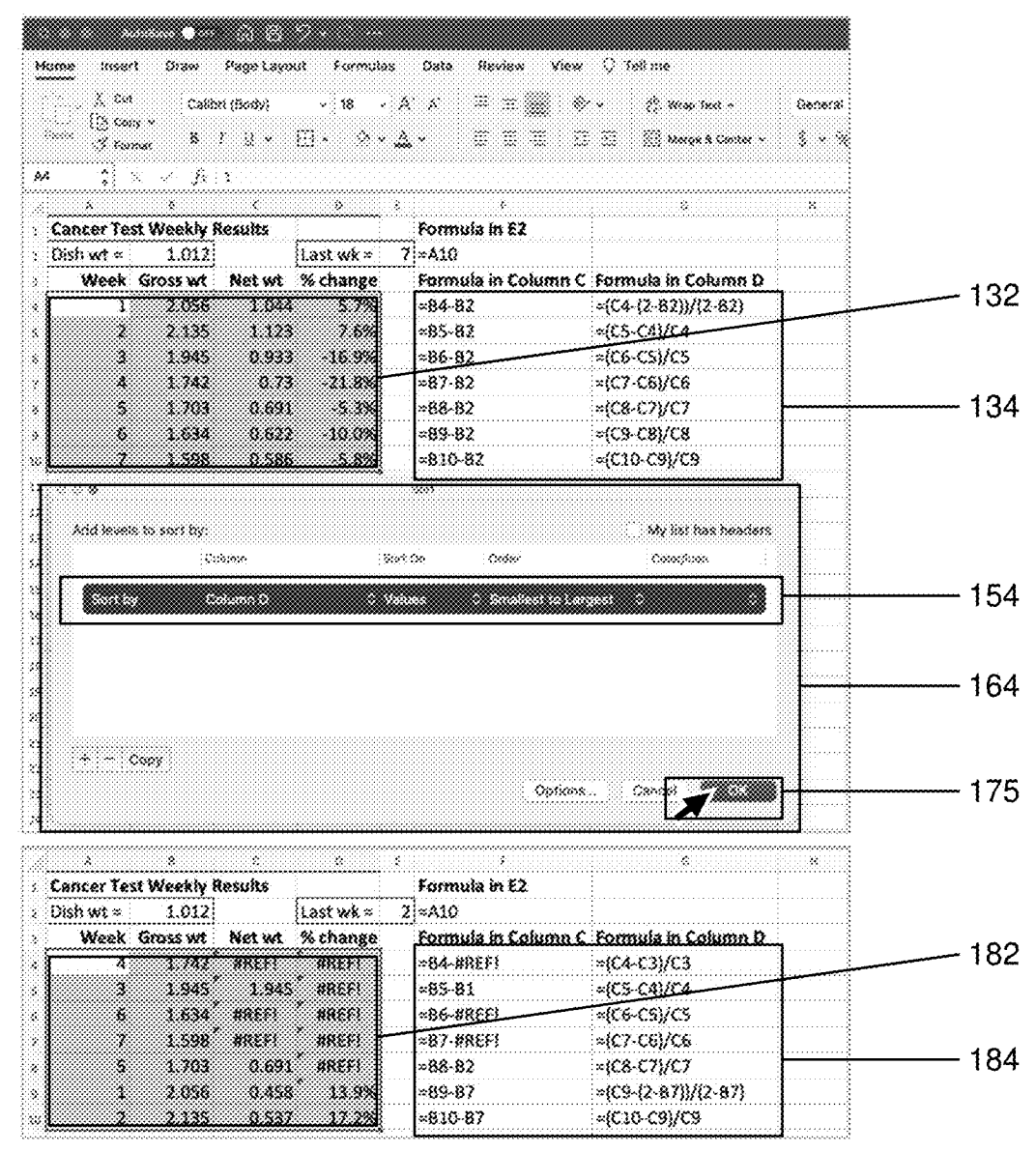

Given Microsoft Excel is the most used spreadsheet in the world, we first example it used by a cancer researcher resorting test values. The cancer researcher has seven weeks of test results and wants to sort them so they can see which weeks had the greatest reduction in the test cancer mass. So, in FIG. 1A the user selects the area in cells 'A4' to 'D10' 132 and triggers the Sort capability getting the popup 164. In that popup they select to do the sort by 'Column D' 'Smallest to Largest' 154 and click the OK button 175 to get the sort result 182 in FIG. 1B. In the post-sort result 182 the columns A and B, which are values, have been resorted without the values changing. However, in columns C and D, which are formulas 184 (134 before sort) referencing cells, all of the values 182 have been corrupted and do not match any of the pre-sort values 132, and many have '#REF!' errors. This is because the formulas retain their pre-sort relative reference relationships (as shown in 184) rather than adjusting those references for the impact of the sort. From a simple user perspective all the formula values are corrupted and useless because none match their pre-sort values.

FIG. 2A and FIG. 2B show the presort and post sort spreadsheet area larger to better show why the post-sort formulas referencing cells do not deliver the presort results. Looking at the row for 'Week' '3' 233 which moves from row '6' to row '5' 273 shows how the formula shifts:

'=*B6*–*B2*' 236 pre-sort

'=*B5*–*B1*' 276 post-sort

Instead of changing those cell references to location of the pre-sort cells post-sort, the formula held the relative position relationships, in this situation moving the 'B2' one row up to 'B1' because the sort row moved one row up from row '6' 233 to row '5' 273. That then generates the corrupted value of '1.945' 274 in 'C5' rather than the correct value of '0.933' 234 in pre-sort 'C6'. The cell reference in cell 'E2' 225 from outside the sort block also is corrupted changing from the value '7' 225 pre-sort (referencing the value in cell 'A10' 251) to the value '2' 265 post-sort (still referencing the value in cell 'A10' 291). This is because the cell reference does not shift to the new location of the cell ('A7' 281) due to the sortation. Thus, exampling how formula value corruption happens both within and outside the sort block in conventional spreadsheets.

Figure 3B:
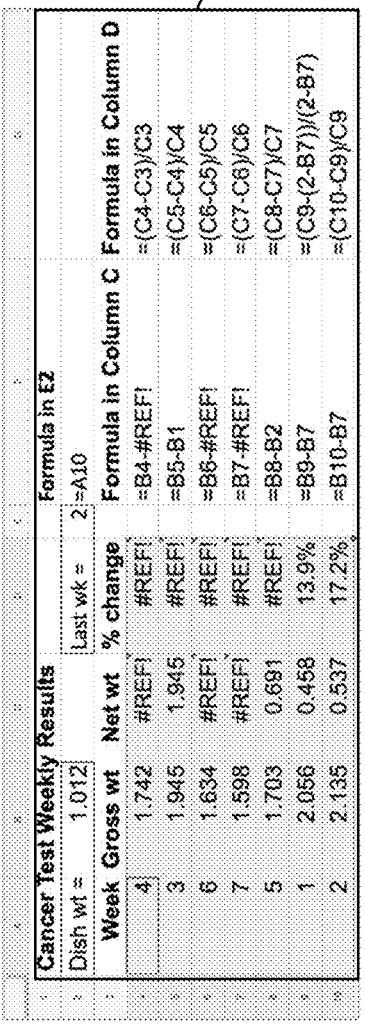

FIG. 3A and FIG. 3B example the same formulas and sort in Google Sheets with the same corrupted output. It applies the same relative position relationship logic rather than our pre-sort to post-sort updating of the formula for the exact change in position of referenced cells which provides an uncorrupted recalculation. The user employs a similar popup sortation selection 362 triggering the sort in Sheets by clicking on the 'Sort' button 374. The user gets a similarly corrupted outcome 385. All of the other known spreadsheets corrupt formulas during sortation. None employ our sorting logic giving uncorrupted results for the sortation of formulas in one or many column sorts done once or done for a succession of different sorts.

Single Cell Reference Formulas

Figures 4A, 4B:
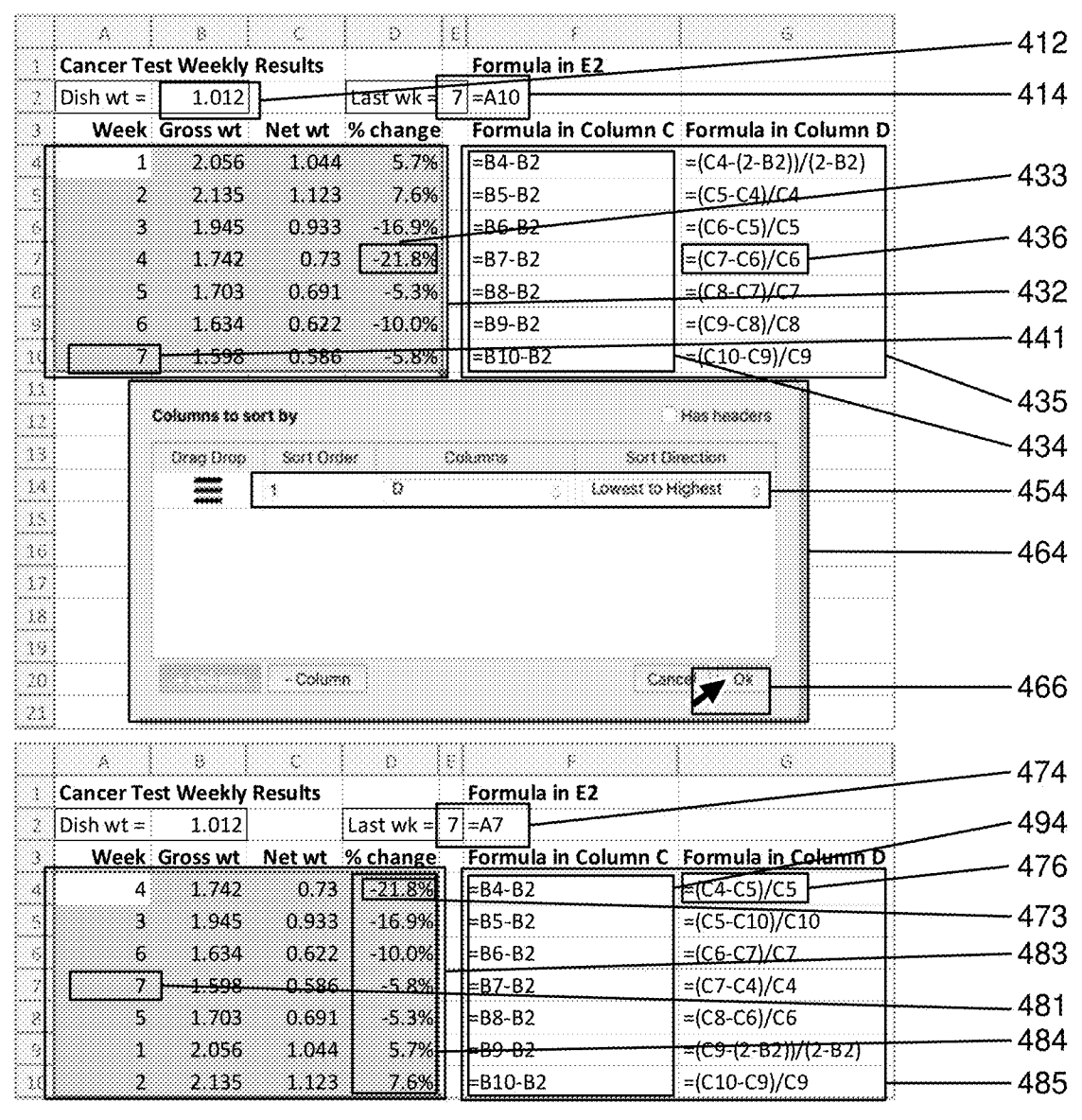

FIG. 4A and FIG. 4B example for our technology using the same formulas and sorts as FIG. 1A through FIG. 3B examples for Microsoft Excel and Google Sheets. However, in our technology none of the formulas are corrupted so all the values shown in the pre-sort 432 can be found in post-sort 483. The pre-sort formulas 435 have all been changed by determining the post-sort location of each pre-sort cell referenced and updating it in the post-sort formulas 485, so that the post-sort recalculation of each formula provides its pre-sort value. This is exampled in the reordering of the cell 'D7' 433 pre-sort to cell 'D4' 473 post-sort with no corruption of its '−21.8%' value. That is because the pre-sort formula 436 is updated in 476 for the change in location of each of the referenced cells with the 'C7' becoming 'C4' and the two 'C6' references becoming 'C5' thereby retaining the same calculation pre and post the sort.

A similar post-sort update of pre-sort cell references is done for cells outside the sort block which reference cells inside the sort block. This is exampled for the value in cell 'E2' of '7' 414 which in the pre-sort formula '=A10' giving the value of cell 'A10' as shown in 441. In the post-sort that cell reference is now '=A7' for the formula in cell 'E2' and its value stays '7' 474 the value in cell 'A7' 481. That is because the formula now refers to the value in cell 'A7' 481, which is the post-sort relocation of the pre-sort cell 'A10' 441 shown in FIG. 4A. Our technology also ensures that cells outside the sort block area 432 referenced in formulas within the cell block area (e.g., 'B2' in the formulas in 435) retain that same cell reference and value after their cell location is shifted. In this example as the rows were sorted on column 'D' 'Lowest to Highest' 454 in the cell range 483, all the formulas in the sort area referencing 'D' 435 continued to reference 'B2' after the sort in the formulas in 485 in FIG. 4B.

Our technology sorts the same whether the values the user is sorting by (i.e., the column or columns ordering the sort) are data or formula values. In the sort done in FIG. 4A and FIG. 4B the sort is done on column 'D' 484 which happens to be a have formulas referencing cells in other rows, some of which will then change post-sort. Those changes are handled by our technology and as we will example later would make no difference for any additional sorts done on these cells or the related cells.

The user sortation process (i.e., sort setup) by which our noncorrupted formula sort is done is conceptually using the same process (i.e., using similar menu, ribbon and/or popup selections) as in Microsoft Excel or Google Sheets examples but with a very different outcome. In this embodiment using a sorting popup 464 where the user in this example selects column 'D' to be sorted 'Lowest to Highest' 454 by clicking the 'Ok' button 466 to get the sort order from '−21.8%' to '7.6%' shown in 484. The user did nothing different process-wise (versus a regular spreadsheet but gets a noncorrupted outcome for cells with formulas referencing cells within the sort block and referencing cells outside the sort block.

Cell Range Formulas

The sorting of formulas referencing ranges face corruption problems within the existing spreadsheets. FIG. 5A through FIG. 5D example that problem in Microsoft Excel. In this example the user has sorted the block of cells in 'A8' to 'E13' 542 (blown up in FIG. 5C) using the sort popup 563 to sort the range by 'Column E' clicking the 'OK' button 574 to get the post-sort block 592 (blown up in FIG. 5D). You can see that none of the pre-sort values in columns 'A' and 'B' 556 have been corrupted in the post-sort 576, however all of the formula values which changed rows post-sort 578 have been corrupted relative to their pre-sort values 558. None of the sorted range function formulas shown in column 'C' 594 and in column 'E' 595 that shifted rows 578 (rows 9 through 13) adjusted their range formulas post sort shifting of the cells in their range. Rather than going in depth on why the conventional spreadsheets get the corrupted values, we instead will example how our technology retains the correct recalculated values by atomizing the ranges, shifting them for the impact of the sorts, and then as desired for formula simplicity recombining the post-sort atomized cell references back into ranges where possible.

FIG. 6A and FIG. 6B example for our technology the same formulas and sorts as FIG. 5A through FIG. 5D examplked for Microsoft Excel. As you can see none of the post-sort cell values 656, 657, 658 and 659 are corrupted relative to their pre-sort values 652 despite the cells in columns 'C' 657, 'D' 658, and 'E' 659 containing cell referencing formulas as shown in 653, 654, 655 and 665. Column 'C' 657 examples an uncorrupted sort of formulas referencing cell ranges, 'B3:D3' in 653, outside the sort block area 652. Column 'E' 659 examples uncorrupted sort of formulas referencing cell ranges entirely or partially within the sort area (block). For example, '=D13/AVERAGE(D10:D12)' in 665, references a cell range 'D10:D12' entirely within the sort block area 652 while '=D10/AVERAGE(D7:D9)' in 655, references a cell range 'D7:D9' partially in and partially out of the sort block area 652 with no value corruption. Column 'D' 658 examples formulas 654 with individual cells within and outside of the sort block area 652 showing that areas employing values, individual cell references and range cell references are successfully sorted together by our technology. As previously mentioned our technology makes doing a sort, for example in popup 683 clicking 'Ok' 693 as simple as conventional spreadsheets but without any corruption of formula generated values. And the same is true for the simpler UI direct from the more standard menu-based sorts.

Our technology also handles situations where the sort (key) results in more than one sort column row cells having the same value (i.e., ties). In those situations where a single key or multi-key sort results in tied "values" our technology can still identify the post-sort location for each pre-sort cell in the sort area. That can be done by our technology many different ways such as having implicit additional sorts determining the locations, having hidden indexes determining the locations or other approaches. These result in our technology being able to determine the location of each cell in the sort area pre-sort and post-sort and therefore correct formulas to retain integrity of the repositioned cell references in all sort situations (e.g., including ties).

FIG. 7A through FIG. 9B illustratively examples steps of the range formula atomization, sorting and recombining done by our technology recognizing that our application may perform the operations differently to achieve these and similar outcomes. For example, in some settings where the range will not change during the sort our app can forgo the atomization and recombination steps. In other embodiments our technology may not do the recombination or use different recombination approaches (e.g., horizontally first, vertically first or algorithms giving the least number of ranges and values).

FIG. 7A and FIG. 7B example for our technology atomizing the cell reference ranges in the sort block area 763. The formula shown in cell 'G8' (for cell 'C8') atomizes 'B3:D3' 746 to 'B3,C3,D3' 776 (in FIG. 7B) which is a range of cells 723 entirely outside of the sort block area 763. The formula shown in cell 'I10' 758 (for cell 'E10') atomizes 'D7:D9' to 'D7,D8,D9' in cell 'I10' 788 (in FIG. 7B). This atomized a range of cells 744 partially inside and partially outside of the sort block area 763 (shown in FIG. 7A). And the formula shown in cell 'I3' 768 (for cell 'E13') atomizes 'D10:D12' 768 to 'D10,D11,D12' 798 (in FIG. 7B), which is a range of cells 756 entirely inside of the sort block area 763 (shown in FIG. 7A).

FIG. 8A and FIG. 8B example our technology sorting the cells 'Highest to Lowest' for column 'E' 844 as the user selected in popup 683 (in FIG. 6A) and retaining the post-sortation uncorrupted values 884 due to our technology adjusting the cell reference values for the sort. Our technology works for cells entirely outside (836 to 886) the sort block area, cells partially in and partially out (848 to 888) of the sort block area, and cells entirely in (858 to 878) the sort block area.

FIG. 9A and FIG. 9B example one embodiment of our technology recombining the atomized ranges within the formulas. Recombining any set of two or more adjacent cells into a range as exampled for all the 'SUM(B3,C3,D3)' formulas in 956 transforming to 'SUM(B3:D3)' formulas in 986. As also exampled in the 'AVERAGE(D8,D11,D12)' formula in 968 transforming to the 'AVERAGE(D8,D11:D12)' formula in 998. In different embodiments our technology uses different recombination approaches ranging from no recombination to algorithmic approaches such as combining vertically first, horizontally first, or trying different combinations to find the least number of references in the ranges.

FIG. 10A through FIG. 11C examples how our technology continues to work for additional sorts. FIG. 10A takes the outcome from the sort done in FIG. 6A and FIG. 6B and does an additional sort on the same sort block 1053 (656, 657, 658, and 659 in FIG. 6B) to get an uncorrupted outcome 1058 (in FIG. 10B). The user is now doing a sort on the values in column 'D' 1054 as shown in the popup sort selector 1074 sorting 'Lowest to Highest'. When they hit 'Ok' 1085 they get the values in 1058 sorted by the values in column 'D' 1059.

FIG. 11A through FIG. 11C then examples the outcomes of the two different sorts starting with the original values 1153 sorted by column 'A' values 1151 in FIG. 11A. Then in FIG. 11B the sort block area 1173 is sorted by column 'E' values 1175. And finally, in FIG. 11C the sort block area 1183 is sorted by column 'D' values 1182. Throughout these sorts all the values are uncorrupted as our technology correctly adjusts the formulas for the pre- to post-sort location differences. 'Column C' 1162 examples outward referencing formulas shown in 1177 'Formula(s) in Column C' referencing a range 'B3:D3' 1122 outside the sort area automatically adjusting its formulas for the sort movements so the values 1162 remain uncorrupted through the first sort in FIG. 11B and the second sort in FIG. 11C. 'Column D' 1163 examples outward referencing formulas shown in 1178 'Formula(s) in Column D' referencing another row in the cell sort area (block) or outside the sort area automatically resorting its formulas for the sort movements so the values 1163 remain uncorrupted through the first sort in FIG. 11B and the second sort in FIG. 11C. 'Column E' 1164 examples outward referencing formulas shown in 1179 'Formula(s) in Column E' referencing a range with other rows fully in the cell sort area (block) or partially outside the sort area (block) automatically resorting its formulas adjusting for the sort movements so the values 1164 remain uncorrupted through the first sort in FIG. 11B and the second sort in FIG. 11C. The user could continue to do sorts and change the sort areas and the values will remain uncorrupted throughout their actions with embodiments of our technology.

Multi-Column Sorts

Our technology can handle as many columns of sorts (keys) as there are columns in the sort area. FIG. 12A through FIG. 17B examples a color coded two column sort example first done in Microsoft Excel and then done in our technology. It examples a cell outside the sort area (inward) with a formula referencing cells within the sort block area and a cell within the sort block area (outward) with two different range functions (SUM and AVERAGE), algebraic operators, and cell formula usage. It examples how our technology is compatible with the color referencing of cells done in traditional spreadsheets. We also color filled the cells to match the color coding of the formulas to make it much easier to see how our technology works with the more complicated sorting of the cells.

Figures 12A, 12B:
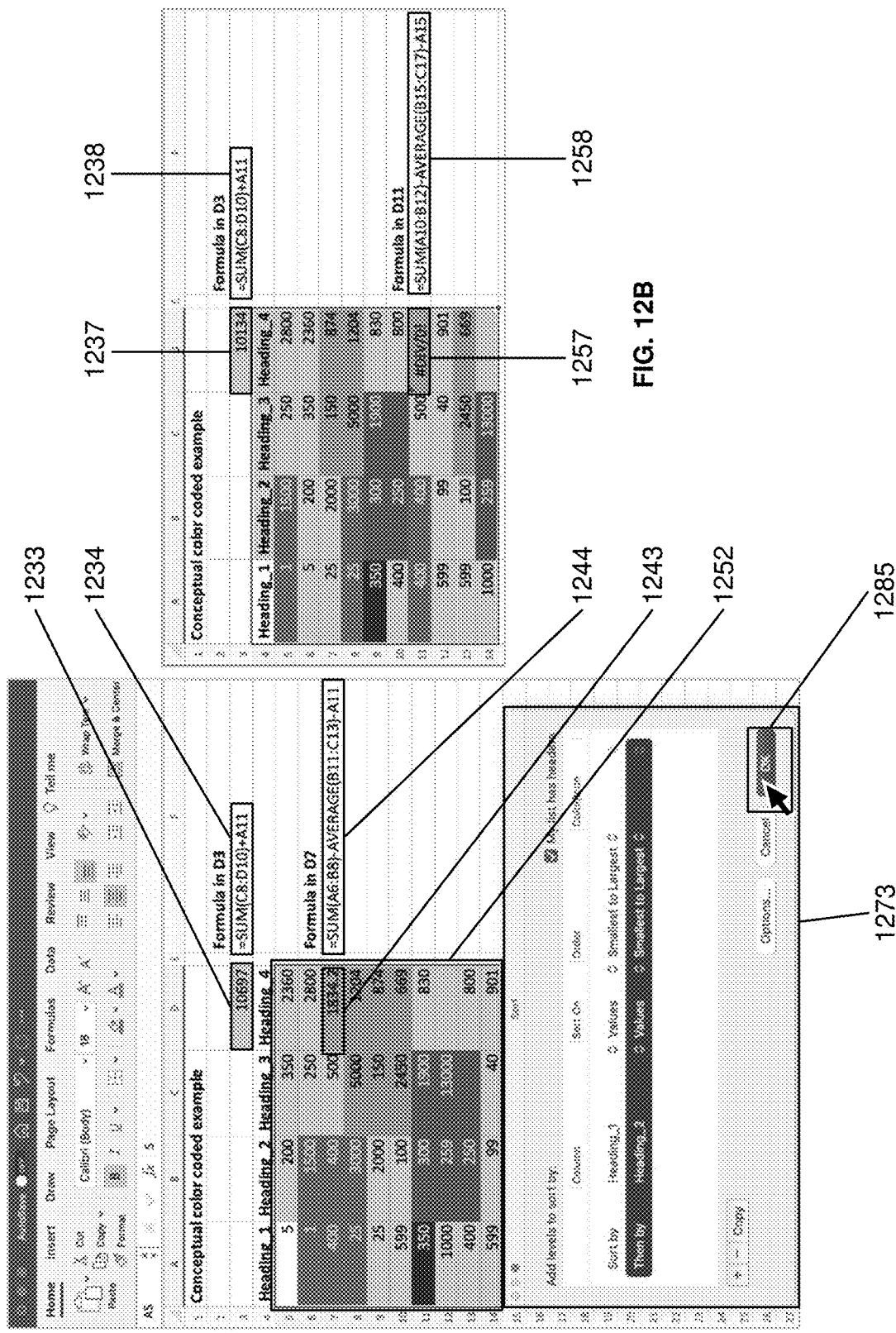
FIGS. 12A and 12B examples a color coded two column sort example in Microsoft Excel showing its corrupted result.

FIG. 12A and FIG. 12B example the Microsoft Excel handing of this conceptual example which has two cells with formulas, 'D3' 1233 and 'D7' 1243. The two formula cells are color filled violet with the other cells referenced in the formulas color filled blue, green, orange, and red. The user has triggered a two-column sort in popup 1273, sorting first by the highlighted values below 'Heading_1' and then in the event of ties by the values in 'Heading_2' in the sort block area 1252. As in our prior examples when the user clicks 'OK' 1285 to trigger the sort, the results they get in values are corrupted. The value '10134' in cell 'D3' 1237 in FIG. 12B not equaling its original value of '10697' in cell 'D3' 1233 in FIG. 12A, and '# DIV/0!' in cell 'D11' 1257 in FIG. 12B not equaling its original value of '1834.2' in cell 'D7' 1243 in FIG. 12A. In this example it is easy to see the Microsoft Excel technology has not adjusted the formulas 1238 and 1258 for the atomization (separation) of the blue, green and orange color block ranges referenced in the pre-sort formulas 1234 and 1244.

FIG. 13A through FIG. 17B examples how our technology handles the multiple (composite key) sort induced atomization of the cell ranges and shifting of referenced cells. It also examples how our technology color codes opened cell formulas to match the cell color highlighting (in our examples the color filling) as traditional spreadsheets (e.g., Microsoft Excel and Google Sheets) do. We have done that simultaneously for both formulas to reduce the number of figures realizing in a spreadsheet users only have one formula opened at a time and in our examples it is like both are open at once exhibiting the color coding of the formulas and the referenced cells.

Figures 13A, 13B:
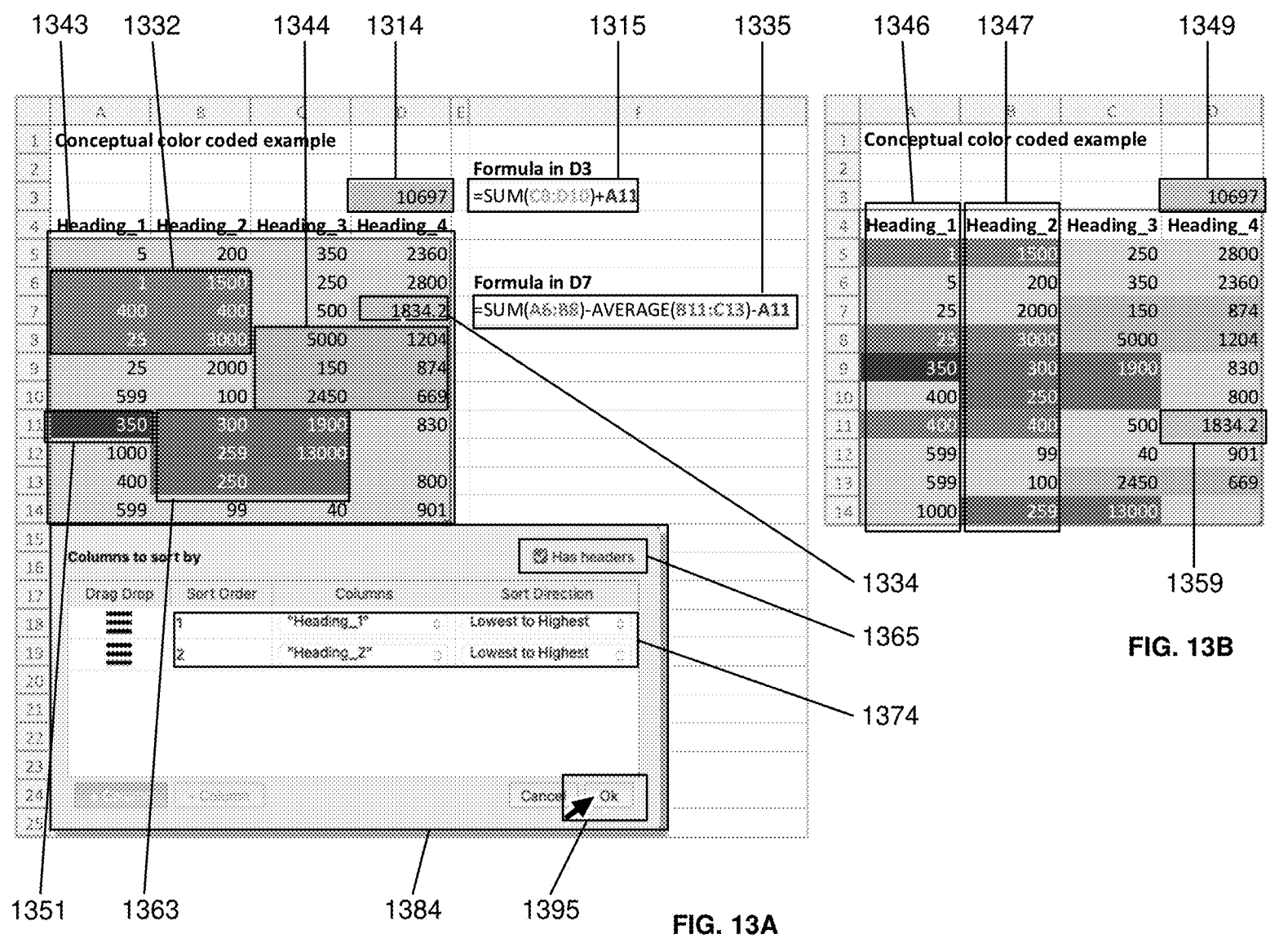

FIG. 13A and FIG. 13B example the before and after of sortation by the highlighted values below 'Heading_1' and then in the event of ties by the values in 'Heading_2' in the sort block area 1343. The user sort 1374 done in popup 1384 has headers 1365. Each of the formulas 1315 and 1335 for the cells 'D3' 1314 and 'D7' 1334 are color coded as if opened to match the referenced cells 1332, 1344, 1351 and 1363. We have then colored the two cells 'D3' 1314 and 'D7' 1334 violet to make them easy to see. FIG. 13B shows the result of the sort by 'Heading_1' 1346 and 'Heading_2' 1347 giving uncorrupted values in 1349 (outside the sort area) and 1359 (which has moved as a result of the sort from cell 'D7' 1334 in FIG. 13A to cell 'D11' 1359 in FIG. 13B)

FIG. 14A and FIG. 14B illustratively example the atomization (separation) of the cell ranges in the formulas for 'D3' (1424 before and 1465 after) and 'D7' (1435 before and 1467 after). FIG. 15A and FIG. 15B example the sortation of the cells with the atomized cell ranges and the formula adjustments for post-sort cell positions. Cell 'D3' (1523 before and 1563 after) does not change position because it is outside the sort area but its formulas (1526 before and 1566 after) change with the shifting (repositioning due to reordering) of the different cells referenced. Cell 'D7' (1533 before) in FIG. 15A moves to 'D11' (1583 after) in FIG. 15B and exhibits substantial change in its formulas (1538 before and 1588 after). Neither cell has corrupted its recalculated value due to the automatic shifting of formula cell references in our technology.

FIG. 16A and FIG. 16B example an embodiment of our technology with a collapsing algorithm that only collapses three or more block contiguous cells as exampled by the collapsing of orange 'C7:D8' in formula 1666 from the formula 1626 and the collapsing of green 'B9:C10' in formula 1688 from the formula 1643. FIG. 17A and FIG. 17B example an embodiment of our technology with a collapsing algorithm that collapses two or more block contiguous cells as exampled by the collapsing of orange 'C7:D8' and 'C12:D12' in formula 1766 from the formula 1726 and the collapsing of blue 'A5:B5', blue 'A11:B11', blue 'A8:B8', green 'B9:C10' and green 'B14:C14', in formula 1788 from the formula 1743. Our technology supports other algorithmic approaches to collapsing the post-sorted atomized values and determinations of situations where ranges can bypass the atomization and collapsing steps because they will not change in the sort.

In the example in FIG. 13A through FIG. 17B the sort was on cells with data values, but our technology works for single (simple key) or multi-sorts (composite key) on cells with formulas that are numeric, date (e.g., COUNT_DATE), Boolean (e.g., COUNT_TRUE) or text (e.g., COUNT_TEXT_UNIQUE) and on cell data that is numeric, date, Boolean or text. Our sort technology works on cells containing functions with cell references that can produce any type of cell value, for example an IF function formula. It also works on cells containing our formulaic data sourced from Non-Spreadsheet Cell (NSC) external data or formulaic data sourced from in-cell values, as we will example next.

Formulaic Data Sorts

Figures 18A, 18B:
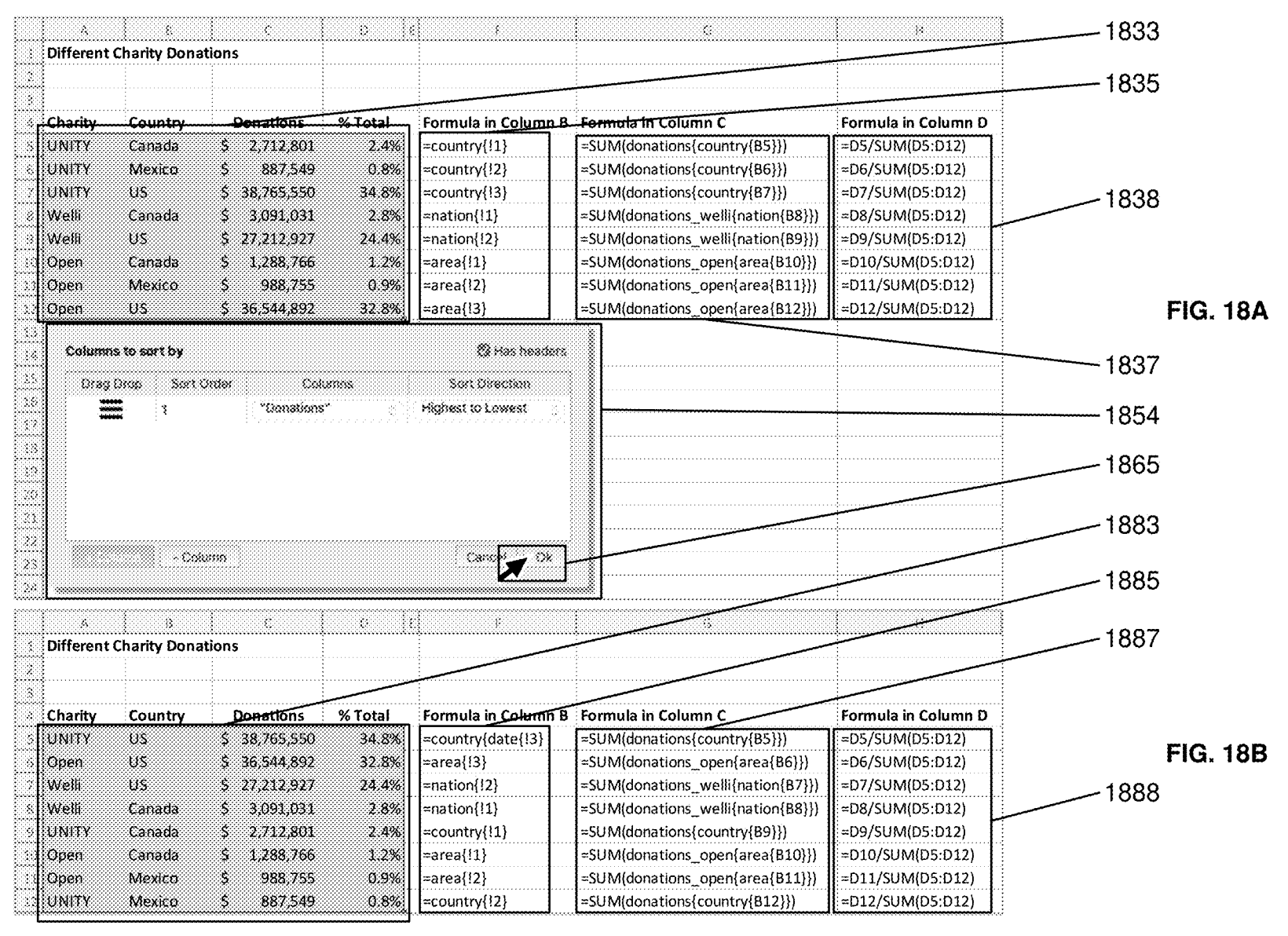

FIG. 18A and FIG. 18B example our sorting technology working for our formulaic data using its data retrievers, our formulaic data using cell references, and non-formulaic data in the formulas. This example uses formulaic data sourced from three different datasets, which could be three different external (NSC) tables, three in-cell datasets or some combination of externally (NSC) and in-cell sourced formulaic data. A North American charity volunteer has data from three different charities for the US, Canada and Mexico. They have constructed an analysis by Charity and Country but want to resort it from Highest to Lowest SUM of donations. To do so the user of our technology has highlighted the cells in 'A4' to 'D12' and initiated a sort with headers as shown in the popup 1854. This use of headers then changes the sort highlight to the cells below the headers 1833, as it would in a traditional spreadsheet. The user has selected a single column (simple key) sort from 'Highest to Lowest' for column of values under the header 'Donations' in the popup 1854. When they click 'Ok' 1865 our technology resorts the values in 1833 to those in 1883 based on the 'Donations' values with no corruption of the values. Our technology successfully sorts and recalculates the formulaic data from the three different datasets in column 'B' as shown by the 'Formula in Column B' 1885 post-sort compared to the 'Formula in Column B' 1835 pre-sort. It also successfully sorts and recalculates (with no value corruption) the formulaic data function formulas using in-row cell references in column 'C' as shown by the 'Formula in Column C' 1887 post-sort compared to the 'Formula in Column C' 1837 pre-sort. Our technology then successfully sorts and recalculates the non-formulaic data formula values in column 'D' as shown by the 'Formula in Column D' 1888 post-sort compared to the 'Formula in Column D' 1838 pre-sort.

FIG. 19A and FIG. 19B example our sorting technology working for our formulaic data using cell references outside (outward) of the sort area and non-formulaic data formulas. It again uses formulaic data sourced from three different datasets, which could be three different external tables, three in-cell datasets or some combination of externally and in-cell sourced formulaic data. The North American charity volunteer redid the previous analysis for dates after '1/1/20' 'C2' 1923 and again wants to sort it from Highest to Lowest SUM of donations. To do so the user of our technology has highlighted the cells in 'A4' to 'D12' and initiated a sort with headers as shown in the popup 1953. This use of headers then changes the sort highlight to the cells 1932 below the headers, as it would in traditional spreadsheet. The user again has selected a single column sort from 'Highest to Lowest' for column of values under the header 'Donations' in the sort popup 1953. When they click 'Ok' 1975 our technology resorts the values in 1932 to those in 1982 in FIG. 19B based on the 'Donations' values with no corruption of the values. Our technology successfully sorts and recalculates the formulaic data from the three different datasets in column 'B' constrained to the value 'date{>C2}' from a cell outside the block sort area as shown by the 'Formula in Column B' 1984 post-sort compared to the 'Formula in Column B' 1934 pre-sort. It also successfully sorts and recalculates (with no value corruption) the formulaic data function formulas using in-row and outside (outward) the block cell sort area cell references in column 'C' as shown by the 'Formula in Column C' 1987 post-sort compared to the 'Formula in Column C' 1937 pre-sort. Our technology then successfully sorts and recalculates the non-formulaic data formula values in column 'D' as shown by the 'Formula in Column D' 1989 post-sort compared to the 'Formula in Column D' 1939 pre-sort. In column 'D' our technology successfully handles the sum of the ranges as the sort alters the locations of the cells in the range.

FIG. 20A and FIG. 20B example our technology successfully sorting and recalculating cells combining formulaic data in function formulas using cell references outside of the sort area and non-formulaic data formulas. It again uses formulaic data sourced from three different datasets, which could be three different external tables, three in-cell datasets or some combination of externally and in-cell sourced formulaic data. The North American charity volunteer does this analysis for dates after '1/1/20' 'C2' 2023 going straight to the calculation of the '% Donations Total' without first calculating the total of the 'Donations'. They want to sort the results from Highest to Lowest '% Donations Total'. To do so the user of our technology has highlighted the cells in 'A4' to 'C12' and initiated a sort with headers as shown in the popup 2053. This use of headers then changes the sort highlight to the cells below the headers 2032, as it would in traditional spreadsheet. The user has selected in the popup 2053 a single column sort from 'Highest to Lowest' for column of values under the header '% Donations Total'. When they click 'Ok' 2065 our technology resorts the values in 2032 to those in 2082 in FIG. 20B based on the '% Donations Total' values with no corruption of the values. Our technology successfully sorts and recalculates the formulaic data from the three different datasets in column 'B' constrained to the value 'date{>C2}' from a cell outside the block sort area as shown by the 'Formula in Column B' 2084 in FIG. 20B post-sort compared to the 'Formula in Column B' 2034 pre-sort in FIG. 20A. It also successfully sorts and recalculates (with no value corruption) the formulaic data function formulas using in-row and outside the block cell sort area cell references in column 'C' as shown by the 'Formula in Column C' 2087 in FIG. 20B post-sort compared to the 'Formula in Column C' 2037 pre-sort in FIG. 20A. These formulas contain formulaic data and non-formulaic data functions algebraically combined. All of which are then sorted with no corruption of values.

Figures 21A, 21B:
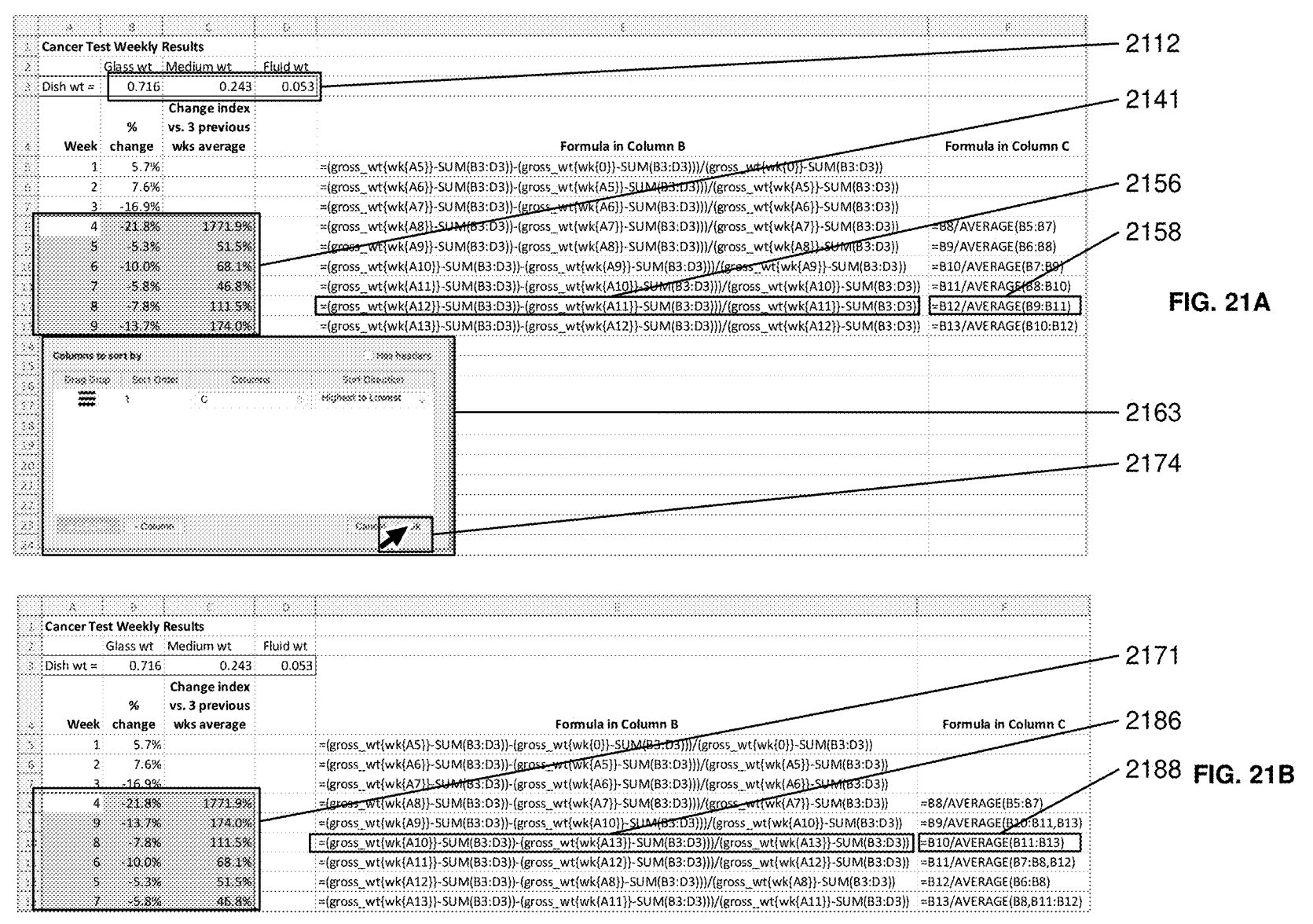

FIG. 21A and FIG. 21B example our technology successfully sorting and recalculating cells combining formulaic data in function formulas using cell references inside and outside of the sort area and non-formulaic data formulas. The formulaic data formulas use cell references from different rows, outward of the sort row within the sort area and outward of the sort area. Our cancer researcher is redoing his weekly cancer test results this time using formulaic data. The formulaic data allows skipping having columns for the 'Gross wt' and 'Net wt' as shown in FIG. 6A and FIG. 6B. Instead, the user immediately does the '% change' calculation using the formulaic data and the 'Dish wt' values in cells 'B3:D3' 2112. That '% change' calculation then uses cell values in its row and in the row above as exampled in the formula in 'B12' 2156:

'=(gross_wt{wk{A12}}-SUM(B3:D3))-
(gross_wt{wk{A11}}-SUM(B3:D3)))/
(gross_wt{wk{A11}}-SUM(B3:D3))' which uses 'A12' that is in the same row and two instances of 'A11' that is in the row above. It also uses three instances of 'B3:D3' which is outside the sort area 2141. When the user triggers the sort 2174 on Column 'C' in popup 2163 it gives the uncorrupted results 2171 FIG. in 21B. As previously described the formulas adjust for the post-sort new positions as shown in 2186 which previously was the formula in 2156 in FIG. 21A. The regular cell formulas in those respective rows, 2188 and 2158 also resort and our technology adjusts their formulas to keep their post-sort recalculations non-corrupted. The user could then do additional sorts of this sort block or involve one or all of the cells in this sort block in other sorts all of which would keep their values uncorrupted. All of this happens without the user having to do anything different in how they trigger doing a sort. Users of our technology no longer need to worry about sorting information with formulas using cell references and getting corrupted values.

Inward by Itself

Our prior descriptions and examples employing inward referencing formulas were in examples also employing outward referencing formulas. However, each of those technologies can operate by themselves. FIG. 22A through FIG. 23B examples inward referencing formulas working by themselves without outward referencing formulas.

Figures 22A, 22B:
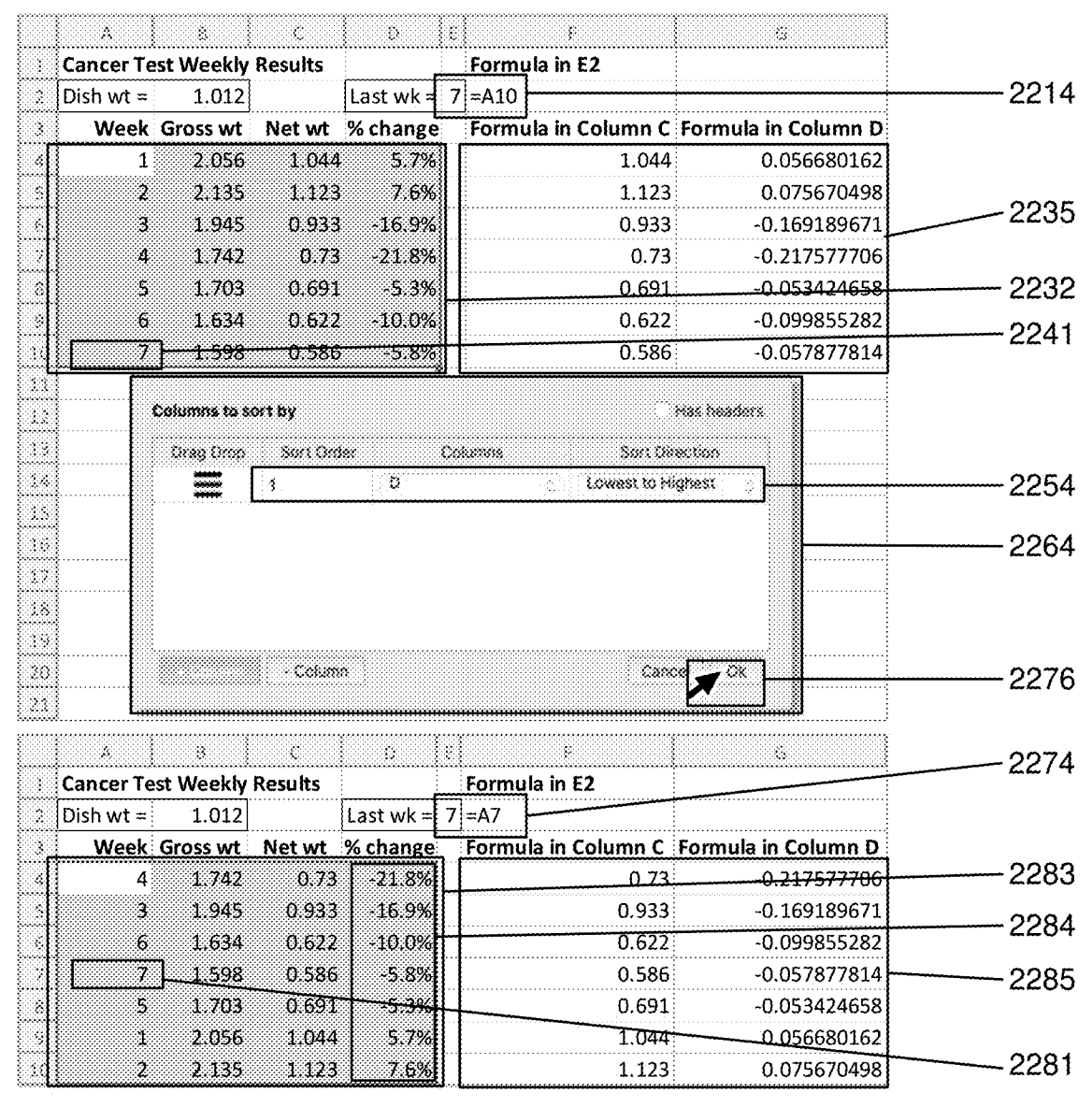

FIG. 22A and FIG. 22B examples an inward referencing formula pre-sort 2214 automatically transformed post-sort 2274 automatically adjusted for the new referenced cell location so that inward referencing cell formula value is not altered (i.e., corrupted) by the recalculation after the sort. The value in cell 'E2' of '7' 2214 which in the pre-sort formula '=A10' giving the value of cell 'A10' of '7' shown in 2241. In the post-sort that cell reference is now '=A7' for the formula in cell 'E2' 2274 and its value stays '7' the value in cell 'A7' 2281. That is because the formula now refers to the value in cell 'A7' 2281, which is the post-sort relocation of the pre-sort cell 'A10' 2241 shown in FIG. 22A. Those inwardly referencing formulas can be simple cell references, as in cell 'E7' with its value of '7' and its formula 2214 in FIG. 22A or can be more complicated formulas as exampled in FIG. 23A 2327 and 2337 referencing multiple cells partially or completely in the sort area.

Inward by Itself Cell Ranges

Figures 23A, 23B:
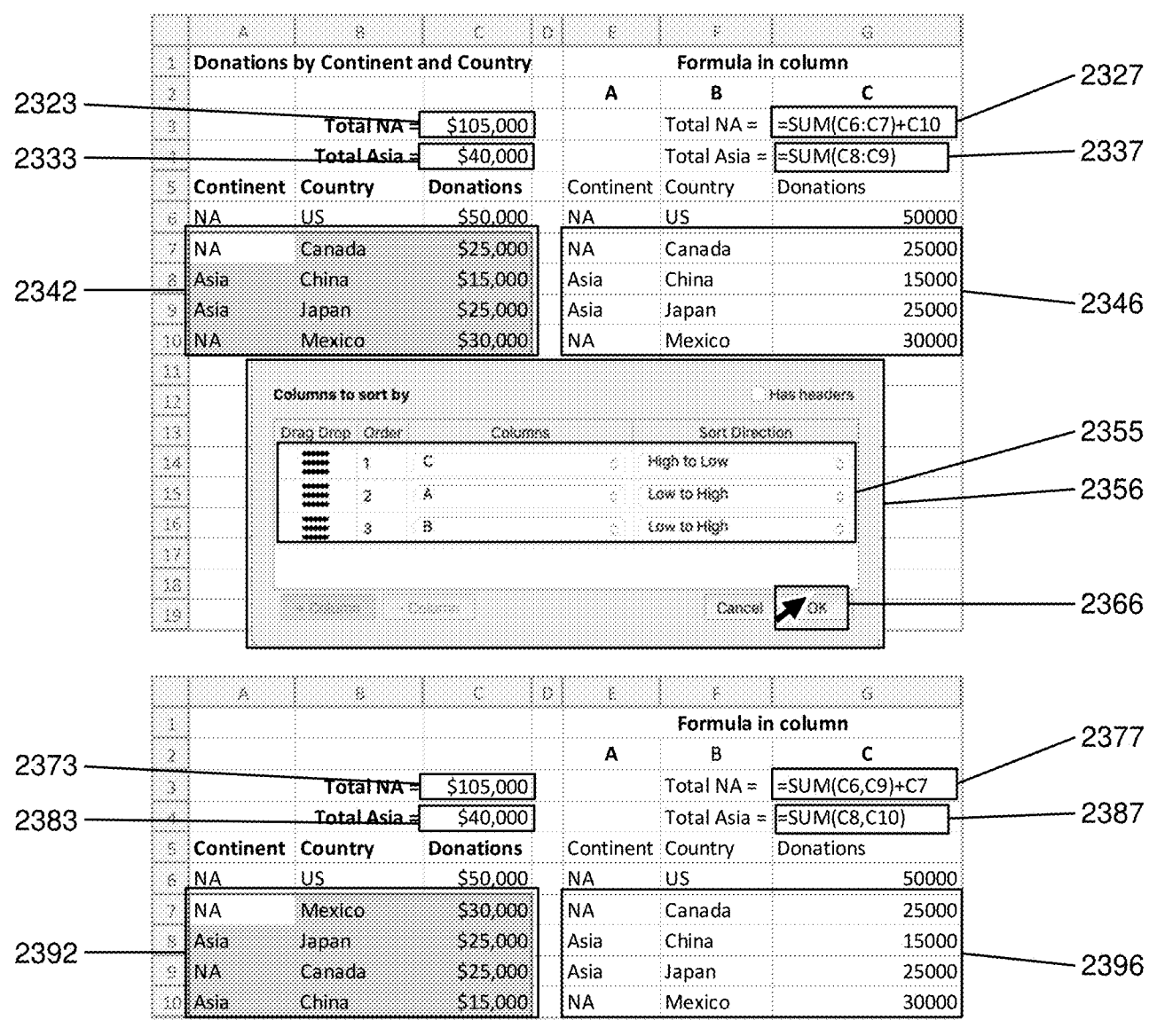

Embodiments of our technology automatically deliver uncorrupted values for the inward referencing formulas, where the inward reference has at least one cell range containing at least one cell within the sortation area (block). FIG. 23A and FIG. 23B examples an inward referencing cell range with all their cells within the sortation area and an inward refencing formula with part of the cell range within the sortation area. In this example we return to the charity user who in FIG. 23A wants to sort the donations in the block of cells 'A7' through 'C10' 2342. To make it easy to see what is going on there is a corresponding block of cells 'E7' through 'G10' 2346 which show the formulas of the cell block 'A7' through 'C10' 2342. This shows that all the cells contain values with no formulas. However, cell 'C3' 2323 contains a formula 2327 referencing cells within the sortation area 2342 and outside it to total the donations for 'NA', while cell 'C4' 2333 contains a formula 2337 referencing cells only within the sortation area 2342 to total the donations for 'Asia'. In this example the user then sets up a three key sort 2355 in the sort selection popup 2356 and clicks 'OK' 2366 to trigger the sort. This delivers the sortation area 2392 in FIG. 23B and automatically transforms the inward range formulas 2377 (2327 in FIG. 23A pre-sort) and 2387 (2337 in FIG. 23A pre-sort) for cells 'C3' 2373 (2323 in FIG. 23A pre-sort) and 'C4' 2383 (2333 in FIG. 23A pre-sort) for the sorting of the referenced cells within the ranges. Our technology preserves the correct values in the cells because it has illustratively atomized the ranges, sorted the cells to retain the correct cell references post-sort as previously exampled. It then, as previously exampled, can collapse the sorted cells into adjacent cell ranges to simplify the formulas.

While we could continue to example mix and match combinations of the inward sorting capabilities previously exampled (e.g., formulaic data, different data sources, different formula combinations, etc.) for inward by itself, we will instead briefly example the outward outside the sort area by itself capabilities. Thereby minimizing the replication of previously exampled capabilities.

Some Particular Implementations—Outward Outside the Sort Area by Itself

Figures 24A, 24B:
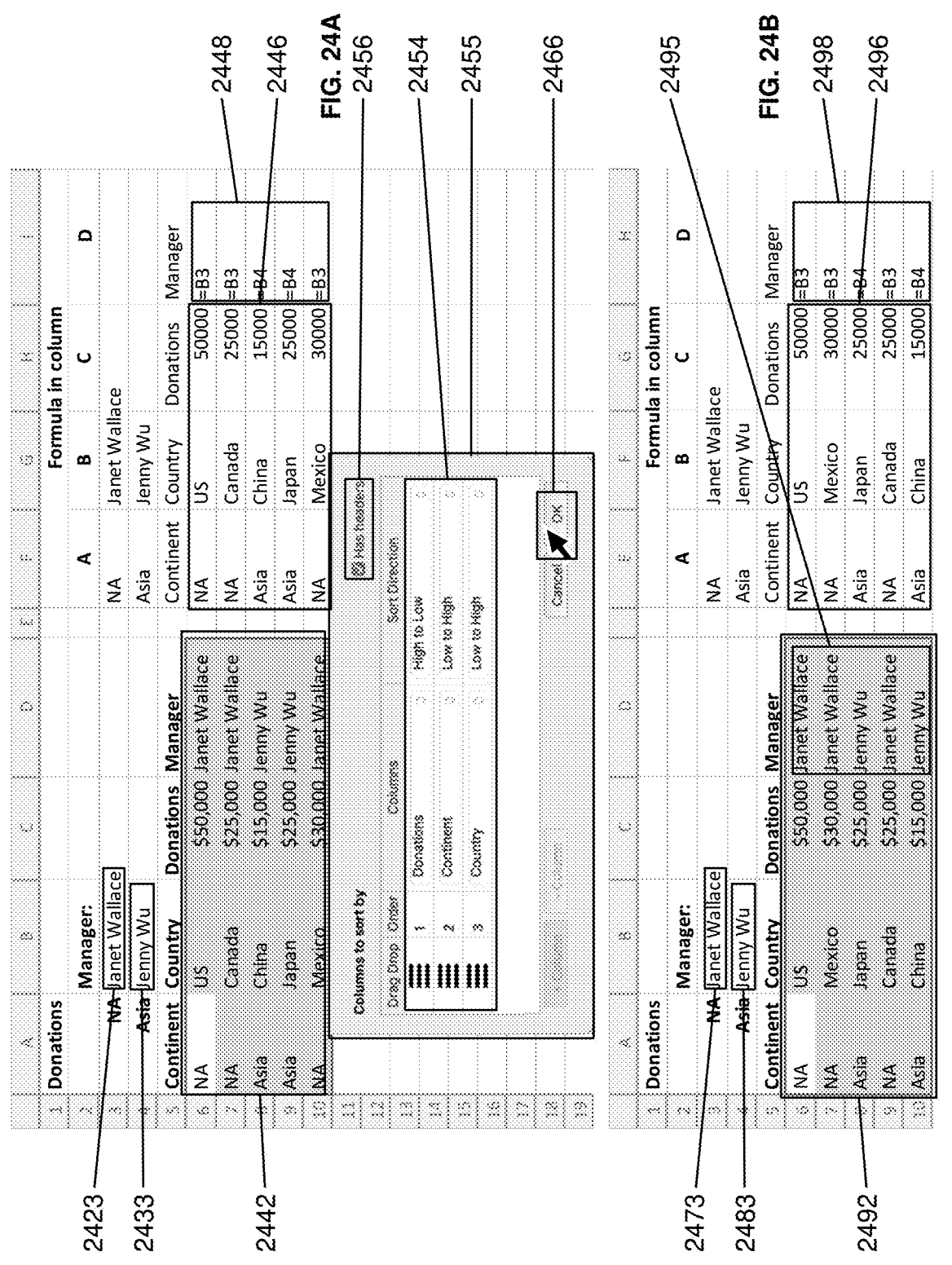

Our prior descriptions and examples employing outward referencing cells outside the sort area also employing outward referencing formulas referring to at least one cell in another row within the sort block. However, each of those technologies can operate by themselves. FIG. 24A and FIG. 24B examples outward referencing formulas referencing cells outside the sort area working by themselves without outward referencing formulas referring to at least one cell in another row within the sort block. In this example the charity user wants to sort the donations and retain the Manager names for each of the countries in a setup where if the manager changes it can replicate throughout the data pre and post sorts. To do so they have set up cells 'B3' 2423 and 'B4' 2433 outside the sort area with the names of the managers and then referenced them in the sort area 2442 column 'D' as shown by the formulas 2448 in the formula exampling of the sort area column 'D'. Note, all the other columns of the sort area 2442 contain values with no formulas as exampled by the lack of formulas in 2446 for columns 'A', 'B' and 'C'. The user then decides to sort the data by descending 'Donations' then by ascending 'Continent' and then by ascending 'Country'. To do so they highlight the cells in 'A5' to 'D10' and initiated a sort with headers 2456 as shown in the popup 2455. This use of headers then changes the sort highlight to the cells below the headers 2442, as it would in a traditional spreadsheet. The user then selects sorts of descending 'Donations', then ascending 'Continent', and then ascending 'Country' 2454 in the popup 2455. When they click 'OK' 2466 our technology resorts the values in 2442 to those in 2492 in FIG. 24B with no corruption of the 'Manager' values 2495. This is because our outward outside the sort area technology has automatically adjusted the 'Manager' cell formulas 2498 so that any changes in location (from the pre-sort locations 2448) did not change the cells that they reference 2473 and 2483. While the user can see that the other sort cells within the sort block 2492 (post-sort) and 2442 (pre-sort) have no formulas 2496 (post-sort) and 2446 (pre-sort).

While we could continue to example mix and match combinations of the outward outside the sort area sorting capabilities previously exampled (e.g., ranges, formulaic data, different data sources, different formula combinations, etc.) for its use in combination with the other outward variant, we will instead briefly example the technology supporting our capabilities.

Computer System

FIG. 25 is a block diagram of an example computer system, according to one implementation. Computer system 2510 typically includes at least one processor 2514 which communicates with a number of peripheral devices via bus subsystem 2512. These peripheral devices may include a storage subsystem 2524 including, for example, memory devices and a file storage subsystem, user interface input devices 2538, user interface output devices 2520, and a network interface subsystem 2516. The input and output devices allow user interaction with computer system 2510. Network interface subsystem 2516 provides an interface to outside networks, including an interface to communication network, and is coupled via communication network to corresponding interface devices in other computer systems or in the cloud and usable for cloud applications.

User interface input devices 2538 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 2510 or onto communication network.

User interface output devices 2520 may include a display subsystem, a printer, a fax machine, or non-visual displays such as audio output devices. The display subsystem may include a touch screen, a flat-panel device such as a liquid crystal display (LCD), a projection device, a cathode ray tube (CRT), or some other mechanism for creating a visible image. The display subsystem may also provide a non-visual display such as via audio output devices. In general, use of the term "output device" is intended to include all possible types of devices and ways to output information from computer system 2510 to the user or to another machine or computer system.

Storage subsystem 2524 stores programming and data constructs that provide the functionality of some or all of the modules and methods described herein. These software modules are generally executed by processor 2514 alone or in combination with other processors.

Memory 2526 used in the storage subsystem can include a number of memories including a main random-access memory (RAM) 2530 for storage of instructions and data during program execution and a read only memory (ROM) 2532 in which fixed instructions are stored. A file storage subsystem 2528 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 2528 in the storage subsystem 2524, or in other machines accessible by the processor.

Bus subsystem 2512 provides a mechanism for letting the various components and subsystems of computer system 2510 communicate with each other as intended. Although bus subsystem 2512 is shown schematically as a single bus, alternative implementations of the bus subsystem may use multiple busses.

Computer system 2510 can be of varying types including a workstation, server, computing cluster, blade server, server farm, or any other data processing system or computing device. Due to the ever-changing nature of computers and networks, the description of computer system 2510 depicted in FIG. 25 is intended only as one example. Many other configurations of computer system 2510 are possible having more or fewer components than the computer system depicted in FIG. 25.

Some Particular Implementations

Some particular implementations and features are described in the following discussion. The technology disclosed can be practiced in a variety of methods, devices, combination of devices or systems or a computer readable media impressed with program instructions that, when executed on hardware cause the hardware either to carry out a disclosed method or combine with the hardware to form a disclosed device or system.

Some Particular Implementations—Outward within Cell Block

One method implementation of the technology solves the problem of corrupting formulas and values when sorting rows containing formulas containing cell references outside (outward of) the sort row. Those formulas can refer to cells within the sorting area (e.g., block) or outside of the sorting area. Our technology determines the post-sort ordering of the rows in the sort area and then for each formula in the pre-sort block determines the location of each cell referenced in the formula among the cells in the post sort ordering and updates the formula for the referenced cell's new location. This is exampled in the cell formula 436 in FIG. 4A changed automatically to 476 in FIG. 4B by our sorting technology thereby ensuring the value 433 in FIG. 4A is not changed by the sort as exampled by 473 in FIG. 4B. Thus retaining the pre-sort values uncorrupted in the post-sort recalculation of the values. The formulas that are in the block and refer to cells that are in another row in the block or outside of the block, can be referred to as outward referencing formulas.

So, in this first example implementation the cell 'D7' 433 is an outward referencing formula because it references at least once (i.e., twice) the cell 'C6' which is in another row of the sortation block 432. Once the sortation takes place the new location of the row containing 'C6' pre-sort is automatically used by our technology to update the formula, replacing in this example 'C6' with 'C5' as shown in the post-sort formula 476. This and the change for the new location of the sorted row (i.e., 'C7' changing to 'C4') updates the cell formula to give the uncorrupted value. Outward referencing sort formulas are also exampled in different types of formulas and combinations of formulas in many of the figures that follow.

Some Particular Implementations—Inward

Our technology applies a similar pre-sort to post-sort referenced cell formula update to formulas outside the sort area (sort block) which reference cells within the sort area (sort block). This is exampled in FIG. 4A 414 automatically changing to 474 FIG. 4B post-sort. Where our technology automatically changed the reference to cell 'A10' 441 pre-sort to the post sort reference to cell 'A7' 481 (in FIG. 4B). Those outside the sort area (sort block) inward referencing formulas (referencing cells inside the sort area) are automatically adjusted for the new referenced cell locations so that their cell values are not altered (i.e., corrupted) by the recalculation after the sort. Those inwardly referencing formulas can be simple cell references, as in cell 'E7' and its formula 414 in FIG. 4A or can be more complicated formulas 1315 as in cell 'D4' 1314 in FIG. 13A which references multiple cells within the sort area via a range function and an algebraic cell reference. These inward referencing formulas can be by themselves, meaning referencing sort areas with no other formulas, or in combination with sort areas including our outward referencing formulas.

Some Particular Implementations—Outward Outside Sort Block

Our technology also ensures that cells outside the sort block area (e.g., outside 432 in FIG. 4A) referenced in formulas within the cell block area (e.g., 'B2' 412 outside the sort area referenced by the formulas within the sort area shown in 'Formula in Column C' 434) retain that same value after their cell location is shifted as done by the sort in 483 in FIG. 4B, and their formulas continue to reference the same cells ('B2' in 'Formula in Column C' in 494). These outward referencing formulas referencing one or more cells outside the sort block automatically retain that correct cell reference with no work required of the sort user. The outward referencing formula can reference a single cell outside of the sorting block as in FIG. 4A and FIG. 4B column C cells in 432 (pre-sort) and 483 (post-sort), or multiple cells as exampled in FIG. 11A through FIG. 11C column 'C' cells 1162 (with formulas referencing 'B3:D3' 1122 outside of the sort area as shown in 1177). Our outward referencing formula technology works by itself, in any combination with the outward referencing formulas within the sort area and our inward referencing formulas technology.

Some Particular Implementations—Cell Ranges

Embodiments of our technology automatically deliver uncorrupted values for the sortation of outwardly referencing formulas, where the outward reference has at least one cell range containing at least one cell within the sortation area (block) but not in the sortation area (block) row of the referencing formula and/or containing at least one cell outside of the sortation block. Our technology automatically atomizes the pre-sort cell range or ranges into their individual cells as exampled in FIG. 7A (pre-atomization) and FIG. 7B (post-atomization) for automatic individual adjustment of their cell locations in the formula post-sort as exampled in FIG. 8A (pre-sort) and FIG. 8B (post-sort). This technology works on any of our outward and inward referencing technologies.

Additional embodiments of our technology automatically collapses the sorted individual cell locations into one or more ranges of adjoining cells, should post-sort there be adjoining cells in the range argument or arguments of the formula as exampled in FIG. 9A (pre-collapse) and FIG. 9B (post-collapse). Our technology supports different collapse thresholds for reforming ranges in outward and inward referencing formulas as exampled for a two adjacent cells threshold in FIG. 17B and a three adjacent cells threshold in FIG. 16B. Adjoining cell collapsing rules or algorithms can vary by primary direction of combination (e.g., vertical then horizontal) or more algorithmic approaches to minimize the number of ranges (e.g., minimize number of range arguments). These different variants work for any of our outward and inward referencing technologies.

Our outward referencing cell range automatic atomization and sorting technology works for cells within the sort area (block) referencing cell ranges entirely within the sort block area (e.g., 768 in FIG. 7A becoming 878 in FIG. 8B), partially in and partially out of the sort block area (e.g., 758 in FIG. 7A becoming 888 in FIG. 8B) or entirely out of the sort block area (e.g., 746 in FIG. 7A becoming 886 in FIG. 8B). Our technology ensures that cell range references are appropriately handled automatically to not corrupt their recalculated values.

Some Particular Implementations—Cell Ranges Inward

Similarly, an embodiment of our technology automatically delivers uncorrupted values for the sortation of inwardly referencing formulas, where the inward referencing formula outside the sortation area (block) has at least one cell range containing at least one cell within the sortation area (block). FIG. 13A and FIG. 13B examples an inward formula referencing a range entirely within the sort area where the post-sort value 1349 is uncorrupted by the sortation (relative to the pre-sort value 1314) by our technology. FIG. 13A examples the related pre-sort formula 1315 and FIG. 16B 1666 or FIG. 17B 1766 example the post-sort formula. Our technology automatically atomizes the pre-sort cell range or ranges into their individual cells as exampled in FIG. 14A 1424 (pre-atomization) and FIG. 14B 1465 (post-atomization) for automatic individual adjustment of their cell locations in the formula post-sort as exampled in FIG. 15A 1526 (pre-sort) and FIG. 15B 1566 (post-sort). Delivering the inward post sort inward range readjusted for the change in cell locations from the sort summarized in FIG. 13A and FIG. 13B.

Our technology also ensures that cell range references are appropriately handled by our technology to not corrupt their recalculated values when only part of the inward referenced cell range is within the sort block and the rest is outside the sort block as exampled in FIG. 11A through FIG. 11C 1145/1146, 1165/1166, and 1185/1186. As previously discussed our technology supports different collapse thresholds for reforming ranges in inward referencing formulas as exampled for a two adjacent cells threshold in FIG. 17B and a three adjacent cells threshold in FIG. 16B. Adjoining cell collapsing rules or algorithms can vary by primary direction of combination (e.g., vertical then horizontal) or more algorithmic approaches to minimize the number of ranges (e.g., minimize number of range arguments).

Some Particular Implementations—Multiple Sorts Working

Our technology continues to avoid formula and value corruption during the sorting of a block of rows when the user continues to do additional different sorts as exampled for a first and second sort in FIG. 11A through FIG. 11C for the different types of outward and inward referencing formulas. Our technology supports the ability to continue to do additional uncorrupted sorts for all the different cell range reference formula situations. The sorts can be done for different sort areas and different sets of single or composite key sorts with no corruption of the formulas and their values.

Some Particular Implementations—Sort Keys Using Outward Formulas

The embodiments of our technology ensure that if the keys used to determine the sort are cells containing outward referencing formulas that the sorts deliver uncorrupted values and automatically adjusted formulas for the sort movements, as exampled in FIG. 4A 432/435 and FIG. 4B 483/485 for individual cell referencing formulas and exampled in FIG. 6A and FIG. 6B for cell range referencing formulas. The keys work for all the different individual and combinations of outward referencing formulas for single and composite keys in our technology.

Some Particular Implementations—Using Formulaic Data Formulas

Our formula and value corruption avoiding sort technology works for our formulaic data sourced from Non-Spreadsheet Cell external data or in-cell data as exampled in FIG. 18A through FIG. 21B. Wherein the formulaic data fields use their own ordered value retrievers as exampled in FIG. 18A 1835 and FIG. 18B 1885, use a combination of their own ordered retrievers and cell references as in FIG. 19A 1934 and FIG. 19B 1984 and/or use cell references within formulaic data within functions as in FIG. 19A 1937 and FIG. 19B 1987. The formulaic data can be combined in sorted cells with regular cell data as exampled in FIG. 20A 2037 and FIG. 20B 2087 and FIG. 21A 2156 and FIG. 21B 2186. The formulaic data can also be utilized with all the different outward and inward cell referencing formulas referencing cell values and cell ranges in the sort area, outside the sort area and partially in and out of the sort area in our technology. The formulaic data can come from multiple different data sets of NSC external or in-cell data sources as exampled with the three different data sets exampled in FIG. 18A through FIG. 20B.

Some Particular Implementations—Outward System or Computer Readable Media

The technology disclosed can be practiced as a method, system or computer readable media. A computer-implemented system implementation can include at least one processor and memory coupled to the processor, the memory holding program instructions that, when executed, implement a method simplifying the entry of values into a spreadsheet cell while organizing and constraining the values that can selected. This system implemented method can include any of the features described above. Alternatively, the computer-implement system can include logic configured so that selected actions that improve spreadsheet operation are carried out by the various segments of logic working individually or cooperatively. A non-transitory computer-readable medium holding program implementation can include instructions that, when executed on a processor, implement a method simplifying the entry of values into a spreadsheet cell while organizing and constraining the values that can selected. As with the system, the method implemented by instructions held by the computer-readable medium can include any of the features describe above.

Some Particular Implementations—Inward by Itself

Our prior descriptions and examples employing inward referencing formulas were in examples also employing outward referencing formulas. However, each of those technologies can operate by themselves. FIG. 22A through FIG. 23B examples inward referencing formulas working by themselves without outward referencing formulas. FIG. 22A and FIG. 22B examples an inward referencing formula with a single cell reference automatically updating for the post-sort change in the pre-sort cell location. The pre-sort inward cell value and formula 2214 automatically transformed post-sort 2274 (values and formulas) so the reference to cell 'A10' 2241 pre-sort is automatically changes to 'A7' 2281 post-sort. The outside the sort area (sort block) inward referencing formulas (referencing cells inside the sort area) are automatically adjusted for the new referenced cell locations so that their cell values are not altered (i.e., corrupted) by the recalculation after the sort. Those inwardly referencing formulas can be simple cell references, as in cell 'E7' and its formula 2214 in FIG. 22A or can be more complicated formulas as exampled in FIG. 23A 2327 and 2337 referencing multiple cells partially or completely in the sort area.

Some Particular Implementations—Inward by Itself Cell Ranges

Embodiments of our technology automatically deliver uncorrupted values for the sortation of inward referencing formulas, where the inward reference has at least one cell range containing at least one cell within the sortation area (block). FIG. 23A and FIG. 23B examples inward referencing cell ranges with all their cells within the sortation area 2337 (pre-sort)/2387 (post-sort), and with part of the cell range within the sortation area 2327 (pre-sort)/2377 (post-sort).

Our technology atomizes the inward pre-sort cell range or ranges into their individual cells, sorts them and then collapses the resulting cells into ranges as previously exampled in FIG. 13A through FIG. 17B. Embodiments of our technology automatically collapses the sorted individual cell locations into one or more ranges of adjoining cells, should post-sort there be adjoining cells in the range argument or arguments of the formula as exampled in FIG. 16A through FIG. 17B. Our technology supports different collapse thresholds for reforming ranges in outward and inward referencing formulas as previously exampled for a two adjacent cells threshold in FIG. 17B and a three adjacent cells threshold in FIG. 16B. Adjoining cell collapsing rules or algorithms can vary by primary direction of combination (e.g., vertical then horizontal) or more algorithmic approaches to minimize the number of ranges (e.g., minimize number of range arguments). This technology works on any of our outward and inward referencing technologies.

Some Particular Implementations—Outward Outside the Sort Area by Itself

Our prior descriptions and examples employing outward referencing cells outside the sort area also employed outward referencing formulas referring to at least one cell in another row within the sort block. However, each of those technologies can operate by themselves. FIG. 24A and FIG. 24B examples outward referencing formulas referencing cells outside the sort area working by themselves without outward referencing formulas referring to at least one cell in another row within the sort block. These capabilities work for single cell references, as exampled in FIG. 24A and FIG. 24B, and multiple cells and/or range references, as exampled in FIG. 11A through FIG. 11C 1162 and 1177.

Some Particular Implementations—System and Computer Readable Memory

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

We claim as follows:

1. A computer-implemented method of sorting of a sort block of data arranged in rows in a spreadsheet, in which each row includes at least one sort key and at least one row in the rows in the spreadsheet includes an outward referencing formula that refers to a cell in another row in the sort block, including:

causing display of the sort block of data;

sorting the sort block in the spreadsheet based on the sort key and determining a post-sort ordering of the rows in the sort block, wherein the post-sort ordering is the order of the rows after the sorting;

for the outward referencing formula in the sort block pre-sort, wherein the outward referencing formula references a pre-sort range of cells, atomizing the pre-sort range into individual pre-sort cells and, after the sorting, determining the cell row and column location for each of the individually referenced pre-sort cells to produce individually determined post-sort cell row and column locations;

automatically updating, without user input, the outward referencing formula in the sort block after the sorting with the determined cell row and column location of each cell referenced by the outward referencing formula; and causing display of an updated version of the sort block of data in the spreadsheet with the updated outward referencing formula in the post-sort ordering.

2. The method of claim 1, further including:

referencing a cell within the sort block of data from at least one inward referencing formula in a cell that is outside the sort block, for the at least one inward referencing formula, determining a cell row and column location of the cell referenced in the inward referencing formula among the cells in the post-sort ordering; and automatically updating after the sorting, without user input, the inward referencing formula outside the sort block with the determined cell row and column location in the sort block after sorting of the cell referenced in the inward referencing formula; and presenting an updated version of the at least one inward referencing cell with the updated inward referencing formula.

3. The method of claim 2, further including, when the inward referencing formula references a pre-sort range of cells, atomizing the pre-sort range into individual pre-sort cells and, after the sorting, determining the cell row and column location for each of the individually referenced pre-sort cells to produce individually determined post-sort cell row and column locations.

4. The method of claim 1, wherein:

the outward referencing formula referring to at least one cell outside the sort block; and further including automatically assuring, without user input, that the outward referencing formula continues to refer to the same cell(s) outside the sort block after sorting of cells.

5. The method of claim 1, further including collapsing the individually determined cell row and column locations, after sorting, into one or more ranges of adjoining cells, when at least two of the individually determined cell row and column locations are adjoining.

6. The method of claim 1, wherein the outward referencing formula within the sort block references a range that is entirely within the sort block.

7. The method of claim 1, wherein the outward referencing formula within the sort block references a range partially within and partially outside the sort block.

8. The method of claim 1, wherein the outward referencing formula within the sort block references a range entirely outside of the sort block.

9. The method of claim 1, further including performing at least one additional sort, repeating the pre-sort to post-sort formula updating to produce uncorrupted values.

10. The method of claim 1, wherein the at least one sort key that is used to determine the post-sort ordering includes outward referencing formulas.

11. The method of claim 1, wherein the outward referencing formula uses formulaic data retrievers that retrieve data from a source outside the spreadsheet.

12. The method of claim 1, wherein the outward referencing formulas use formulaic data formulas using cell references inside the spreadsheet to supply filtering values used in retrieving data from a source outside the spreadsheet.

13. The method of claim 1, wherein the outward referencing formulas use formulaic data from multiple different data source tables outside the spreadsheet.

14. A system including a processor coupled to memory, the memory loaded with computer instructions to sort of a sort block of data arranged in rows in a spreadsheet, the instructions, when executed on the processor, implement actions comprising:
sorting of a sort block of data arranged in rows in a spreadsheet, in which each row includes at least one sort key and at least one row in the rows in the spreadsheet includes an outward referencing formula that refers to a cell in another row in the sort block, including:
causing display of the sort block of data;
sorting the sort block in the spreadsheet based on the sort key and determining a post-sort ordering of the rows in the sort block, wherein the post-sort ordering is the order of the rows after the sorting;
for the outward referencing formula in the sort block pre-sort, wherein the outward referencing formula references a pre-sort range of cells, atomizing the pre-sort range into individual pre-sort cells and, after the sorting, determining the cell row and column location for each of the individually referenced pre-sort cells to produce individually determined post-sort cell row and column locations;
automatically updating, without user input, the outward referencing formula in the sort block after the sorting with the determined cell row and column location of each cell referenced by the outward referencing formula; and
causing display of an updated version of the sort block of data in the spreadsheet with the updated outward referencing formula in the post-sort ordering.

15. The system of claim 14, the actions further including:
referencing a cell within the sort block of data from at least one inward referencing formula in a cell that is outside the sort block,
for the at least one inward referencing formula, determining a cell row and column location of the cell referenced in the inward referencing formula among the cells in the post-sort ordering; and
automatically updating after the sorting, without user input, the inward referencing formula outside the sort block with the determined cell row and column location in the sort block after sorting of the cell referenced in the inward referencing formula; and
presenting an updated version of the at least one inward referencing cell with the updated inward referencing formula.

16. The system of claim 15, the actions further including, when the inward referencing formula references a pre-sort range of cells, atomizing the pre-sort range into individual pre-sort cells and, after the sorting, determining the cell row and column location for each of the individually referenced pre-sort cells to produce individually determined post-sort cell row and column locations.

17. The system of claim 14, wherein:
the outward referencing formula referring to at least one cell outside the sort block; and
further including automatically assuring, without user input, that the outward referencing formula continues to refer to the same cell(s) outside the sort block after sorting of cells.

18. A tangible non-transitory computer readable storage medium, including program instructions loaded into memory that, when executed a processor, causes the processor to implement actions of sorting of a sort block of data arranged in rows in a spreadsheet, in which each row includes at least one sort key and at least one row in the rows in the spreadsheet includes an outward referencing formula that refers to a cell in another row in the sort block, including:
causing display of the sort block of data;
sorting the sort block in the spreadsheet based on the sort key and determining a post-sort ordering of the rows in the sort block, wherein the post-sort ordering is the order of the rows after the sorting;
for the outward referencing formula in the sort block pre-sort, wherein the outward referencing formula references a pre-sort range of cells, atomizing the pre-sort range into individual pre-sort cells and, after the sorting, determining the cell row and column location for each of the individually referenced pre-sort cells to produce individually determined post-sort cell row and column locations:
automatically updating, without user input, the outward referencing formula in the sort block after the sorting with the determined cell row and column location of each cell referenced by the outward referencing formula; and
causing display of an updated version of the sort block of data in the spreadsheet with the
updated outward referencing formula in the post-sort ordering.

19. The tangible non-transitory computer readable storage medium of claim 18, further including:
referencing a cell within the sort block of data from at least one inward referencing formula in a cell that is outside the sort block,
for the at least one inward referencing formula, determining a cell row and column location of the cell referenced in the inward referencing formula among the cells in the post-sort ordering; and
automatically updating after the sorting, without user input, the inward referencing formula outside the sort block with the determined cell row and column location in the sort block after sorting of the cell referenced in the inward referencing formula; and
presenting an updated version of the at least one inward referencing cell with the updated inward referencing formula.

20. The tangible non-transitory computer readable storage medium of claim 19, the actions further including, when the inward referencing formula references a pre-sort range of cells, atomizing the pre-sort range into individual pre-sort cells and, after the sorting, determining the cell row and column location for each of the individually referenced pre-sort cells to produce individually determined post-sort cell row and column locations.

21. The tangible non-transitory computer readable storage medium of claim 18, wherein:
   the outward referencing formula referring to at least one cell outside the sort block; and
   further including automatically assuring, without user input, that the outward referencing formula continues to refer to the same cell(s) outside the sort block after sorting of cells.

* * * * *

UNITED STATES PATENT AND TRADEMARK OFFICE
CERTIFICATE OF CORRECTION

PATENT NO. : 12,321,695 B2
APPLICATION NO. : 17/988641
DATED : June 3, 2025
INVENTOR(S) : Dvorak et al.

It is certified that error appears in the above-identified patent and that said Letters Patent is hereby corrected as shown below:

On the Title Page

At (57) ABSTRACT, delete the following:
"The technology disclosed relates to accessing data within or external to spreadsheet cells (NSC data) and presenting it to users, so they can select one or more value to populate the cell. In one implementation, the technology disclosed is a spreadsheet function (predefined formula) where the user inputs a cell range or NSC data formula resulting in a button operated drop-down (pop-up or other visual) populating one value within the cell. Once the formula is completed the user can change that value by clicking the button and selecting the desired value from the multiple values presented. In another implementation the function input can be altered to add a constraint (filter) limiting the values presented for selection. In variants of any of the implementations, the presented values can be organized in ascending or descending orders for easy selection and show all values or only the unique (distinct) values."

And replace it with the following:
The technology disclosed avoids the corruption of formulas in spreadsheet cells when those cells are sorted and/or the corruption of formulas referencing a cell or cells within a sort area. Our technology automatically adjusts cell formulas for the altered location of each cell that was moved during the sort thereby maintaining the integrity of every formula post sort. When cell ranges are involved our technology automatically atomizes the range into its individual spreadsheet cells and then does the automatic adjustment of the sorted cells in the formula. Further implementations then collapse those atomized and resorted formula arguments into one or more ranges in order to reduce the number of post-sort arguments resulting from the pre-sort range.

In the Specification

In Column 1, Line 54, delete "herein.)." and insert -- herein. --.

In Column 2, Line 23, delete "presort" and insert -- pre-sort --.

Signed and Sealed this
Twenty-third Day of December, 2025

John A. Squires
*Director of the United States Patent and Trademark Office*

CERTIFICATE OF CORRECTION (continued)
U.S. Pat. No. 12,321,695 B2

In Column 6, Line 22, delete "'D'" and insert -- 'B2' --.

In Column 7, Line 60, delete "'13'" and insert -- 'I13' --.

In Column 8, Line 11, delete "'AVERAGE(D8, D11, D12)'" and insert -- 'AVERAGE(D8, D12, D11)' --.

In Column 8, Lines 12-13, delete "'AVERAGE(D8, D11, D12)'" and insert -- 'AVERAGE(D8, D12, D11)' --.

In Column 12, Line 67, delete "refencing" and insert -- referencing --.

In Column 18, Line 45, delete "Iteself" and insert -- Itself --.

In the Claims

In Column 22, Claim 18, Line 33, delete "locations:" and insert -- locations; --.

In Column 22, Claim 18, Lines 41-42, delete "updated ......... ordering." and insert the same on Line 40, after "the", as a continuation paragraph.